United States Patent
Homma et al.

(10) Patent No.: US 11,647,059 B2
(45) Date of Patent: May 9, 2023

(54) COMMUNICATION MANAGEMENT APPARATUS, COMMUNICATION SYSTEM, COMMUNICATION METHOD, AND NON-TRANSITORY RECORDING MEDIUM

(71) Applicants: Takeshi Homma, Kanagawa (JP);
Hiroshi Hinohara, Kanagawa (JP);
Shigeru Nakamura, Kanagawa (JP);
Yuichi Kawasaki, Kanagawa (JP);
Masashi Ogasawara, Tokyo (JP);
Atsushi Miyamoto, Kanagawa (JP)

(72) Inventors: Takeshi Homma, Kanagawa (JP);
Hiroshi Hinohara, Kanagawa (JP);
Shigeru Nakamura, Kanagawa (JP);
Yuichi Kawasaki, Kanagawa (JP);
Masashi Ogasawara, Tokyo (JP);
Atsushi Miyamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 215 days.

(21) Appl. No.: 17/169,557

(22) Filed: Feb. 8, 2021

(65) Prior Publication Data
US 2021/0286773 A1   Sep. 16, 2021

(30) Foreign Application Priority Data
Mar. 13, 2020   (JP) .............................. JP2020-044586

(51) Int. Cl.
*H04L 65/40* (2022.01)
*G06F 21/62* (2013.01)
*G06F 16/44* (2019.01)

(52) U.S. Cl.
CPC .............. *H04L 65/40* (2013.01); *G06F 16/44* (2019.01); *G06F 21/6218* (2013.01)

(58) Field of Classification Search
CPC ....... H04L 65/40; H04L 65/403; H04L 65/80; G06F 16/44; G06F 21/6218; G06F 21/84; G06F 21/79
See application file for complete search history.

(56) References Cited

U.S. PATENT DOCUMENTS

| 2016/0267287 A1* | 9/2016 | Kobayashi | G06F 21/84 |
| 2018/0069962 A1* | 3/2018 | Kato | H04N 7/15 |

(Continued)

FOREIGN PATENT DOCUMENTS

| JP | 2015-060592 | 3/2015 |
| JP | 2016-170675 | 9/2016 |

OTHER PUBLICATIONS

U.S. Appl. No. 16/935,211, filed Jul. 22, 2020, Yuichi Kawasaki, et al.

(Continued)

*Primary Examiner* — Grant Sitta
(74) *Attorney, Agent, or Firm* — Xsensus LLP

(57) ABSTRACT

A communication management apparatus includes a memory and circuitry. The memory stores a hierarchical data structure in which each page of a plurality of pages forming a display screen shared by a plurality of communication terminals is associated with one or more objects included in the each page. The circuitry receives, from one communication terminal of the plurality of communication terminals, an operation request that requests an operation on a particular object of the one or more objects. When editing of the particular object and editing of data in a lower layer associated with a higher layer of the particular object are both allowed, the circuitry transmits a success notification to the one communication terminal to notify success of the operation on the particular object.

18 Claims, 26 Drawing Sheets

(56) References Cited

U.S. PATENT DOCUMENTS

| | | |
|---|---|---|
| 2020/0177742 A1 | 6/2020 | Homma et al. |
| 2020/0278823 A1 | 9/2020 | Kawasaki et al. |
| 2020/0296145 A1 | 9/2020 | Horiuchi et al. |
| 2020/0296146 A1 | 9/2020 | Hinohara et al. |
| 2021/0026509 A1 | 1/2021 | Homma et al. |

OTHER PUBLICATIONS

U.S. Appl. No. 16/989,889, filed Aug. 11, 2020, Hiroshi Hinohara, et al.
U.S. Appl. No. 17/019,362, filed Sep. 14, 2020, Daiki Nakamura, et al.
U.S. Appl. No. 17/030,399, filed Sep. 24, 2020, Kazunobu Takahashi, et al.
U.S. Appl. No. 17/068,851, filed Oct. 13, 2020, Kota Nagaoka, et al.

* cited by examiner

FIG. 6A
FIG. 6 | FIG. 6A / FIG. 6B
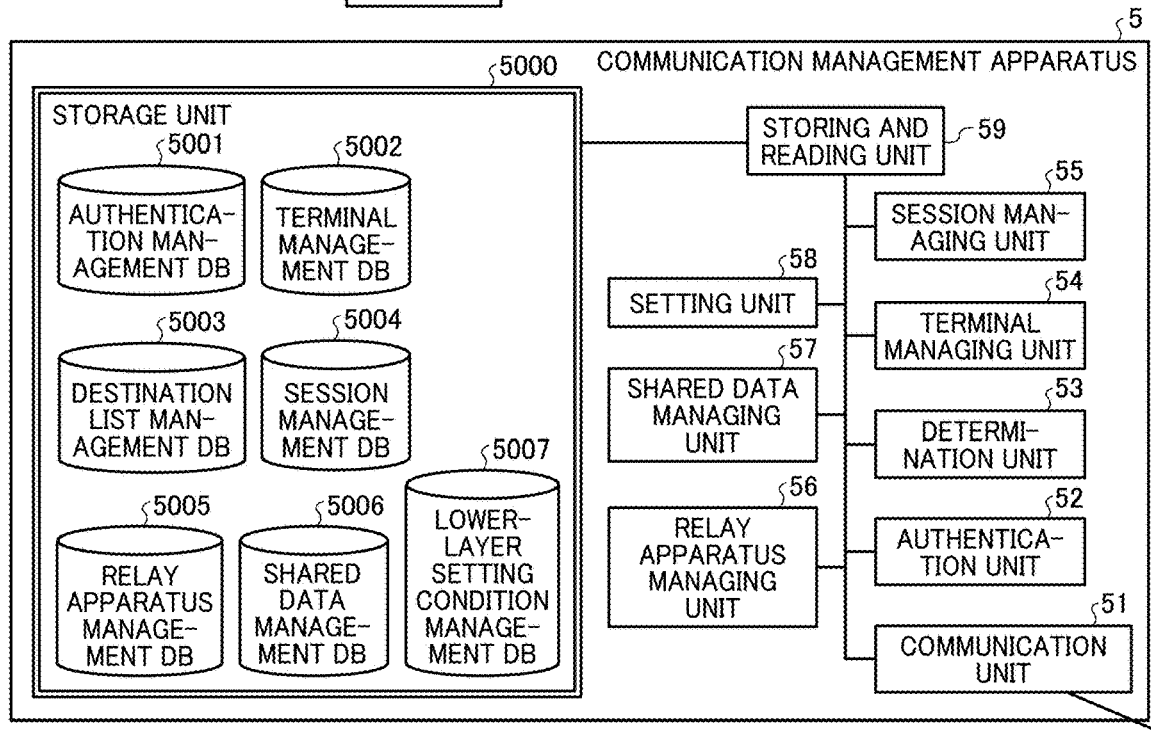
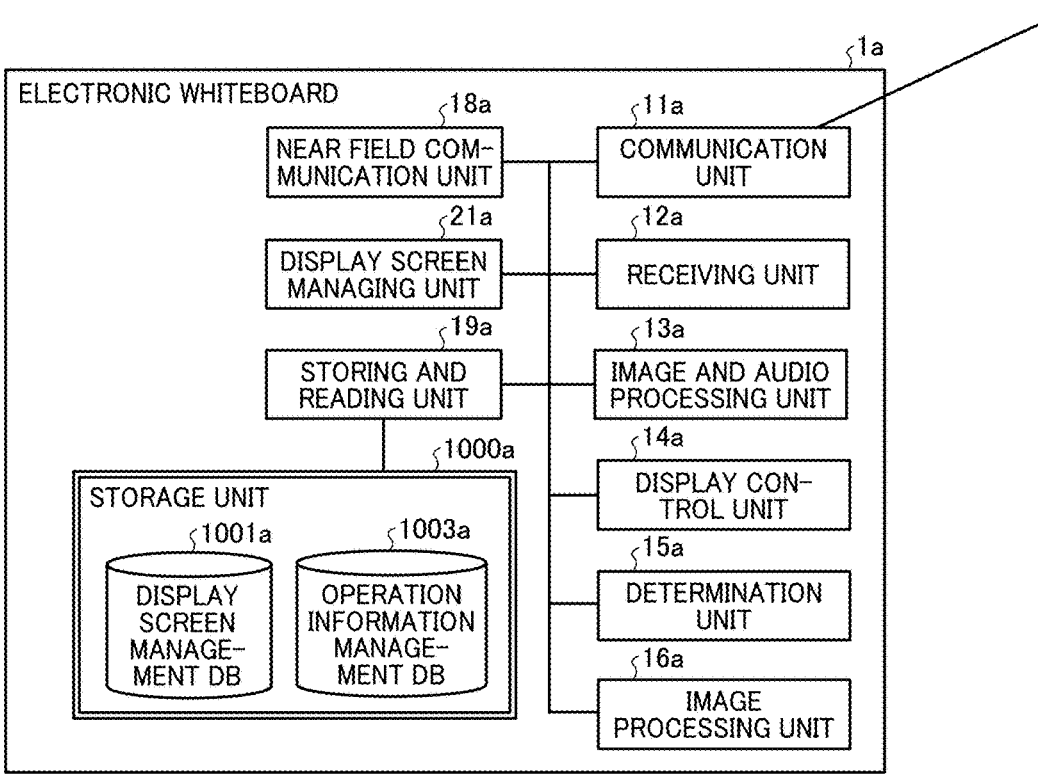

FIG. 8

Id : "ccccc"
DistId : "pag01"
Operation Type : "Add"
Data Type : "Stroke"
Data : "(2,2), (2,4), (3,6), (2,9)"

FIG. 9

| TERMINAL ID | PASSWORD |
|---|---|
| 01aa | aaaa |
| 01ba | baba |
| 01ca | caca |
| ... | ... |

FIG. 10

| TERMINAL ID | DESTINATION NAME | OPERATION STATE | RECEPTION TIME | TERMINAL IP ADDRESS |
|---|---|---|---|---|
| 01aa | TERMINAL AA, TOKYO BRANCH, JAPAN | ON-LINE (COMMUNICATION AVAILABLE) | 2020.2.10.13:40 | 1.2.1.3 |
| 01ab | MR. AB, TOKYO BRANCH, JAPAN | ON-LINE (COMMUNICATING) | 2020.2.09.12:00 | 1.2.1.4 |
| 01ac | MS. AC, TOKYO BRANCH, JAPAN | OFF-LINE | 2020.2.09.12:30 | 1.2.1.5 |
| ... | ... | ... | ... | ... |
| 01ba | TERMINAL BA, BEIJING BRANCH, CHINA | ON-LINE (COMMUNICATION AVAILABLE) | 2020.2.10.13:45 | 1.2.2.3 |
| 01bb | MR. BB, BEIJING BRANCH, CHINA | ON-LINE (COMMUNICATION TEMPORARILY INTERRUPTED) | 2020.2.10.13:50 | 1.2.2.4 |
| ... | ... | ... | ... | ... |
| 01ca | TERMINAL CA, WASHINGTON D.C. BRANCH, US | OFF-LINE | 2020.2.10.12:45 | 1.3.1.3 |
| 01cb | MS. CB, WASHINGTON D.C. BRANCH, US | ON-LINE (COMMUNICATING) | 2020.2.10.13:55 | 1.3.1.4 |
| ... | ... | ... | ... | ... |
| 01da | TERMINAL DA, BERLIN BRANCH, EUROPE | ON-LINE (COMMUNICATING) | 2020.2.08.12:45 | 1.3.2.3 |
| 01db | MR. DB, BERLIN BRANCH, EUROPE | ON-LINE (COMMUNICATION AVAILABLE) | 2020.2.10.12:45 | 1.3.2.4 |
| ... | ... | ... | ... | ... |

FIG. 11

| TERMINAL ID OF STARTING TERMINAL | TERMINAL IDS OF DESTINATION CANDIDATE TERMINALS |
|---|---|
| 01aa | 01ab,···,01ba,01bb,···,01ca,01cb,01da,01db,··· |
| 01ab | 01aa,01ca,01cb,01da |
| ... | ... |
| 01ba | 01aa,01ab,01ca,01cb,01da,01db |
| ... | ... |
| 01ca | 01aa,01ab,01ba,···,01cb,···,01db |

FIG. 12

| SESSION ID | STARTING TERMINAL ID | DESTINATION TERMINAL ID | DELAY TIME (ms) | DELAY INFORMATION RECEPTION TIME |
|---|---|---|---|---|
| se01 | 01aa | 01db | 200 | 2020.2.10.13:41 |
| se02 | 01ba | 01cb | 50 | 2020.2.10.12:01 |
| ... | ... | ... | ... | ... |

FIG. 13

| RELAY APPARATUS ID | OPERATION STATE | RECEPTION TIME | RELAY APPARATUS IP ADDRESS | MAXIMUM DATA TRANSMISSION SPEED (Mbps) |
|---|---|---|---|---|
| 111a | ON-LINE | 2020.2.10.13:00 | 1.2.1.2 | 100 |
| 111b | OFF-LINE | 2020.2.10.13:10 | 1.2.2.2 | 1000 |
| 111c | ON-LINE | 2020.2.10.13:20 | 1.3.1.2 | 100 |
| 111d | ON-LINE | 2020.2.10.13:30 | 1.3.2.2 | 10 |

FIG. 14

SESSION ID : se02

SESSION ID : se01

| ID | SEQUENCE NUMBER | body | parent | edit | lower level |
|---|---|---|---|---|---|
| se01 | 1 | children : pag01, pag02, pag03<br>current page : pag02 | - | unlock | unlock |
| pag01 | 2 | URL OF IMAGE DATA: http://xxx.jpeg | se01 | lock | unlock |
| aaaaa | 3 | COLOR(RGBA) : (0,0,0,0)<br>WIDTH(px) : 10px<br>VERTICES(x,y) : (0,0), (10,0), (20,1), (30,10) | pag01 | unlock | - |
| bbbbb | 4 | COLOR(RGBA) : (128,0,0,0)<br>WIDTH(px) : 14px<br>VERTICES(x,y) : (10,50), (15,55), (16,40) | pag01 | lock | - |
| ... | ... | ... | ... | ... | ... |
| pag02 | 6 | URL OF IMAGE DATA: http://yyy.jpeg | se01 | unlock | unlock |
| ddddd | 7 | COLOR(RGBA) : (255,255,255,0)<br>WIDTH(px) : 10px<br>VERTICES(x,y) : (100,20), (110,30), (11,40) | pag02 | lock | - |
| ... | ... | ... | ... | ... | ... |
| pag03 | 9 | URL OF IMAGE DATA: http://zzz.jpeg | se01 | lock | lock |
| ... | ... | ... | ... | ... | ... |

FIG. 15

| No. | OPERATION ITEM | SETTING INFORMATION |
|---|---|---|
| 1 | REMOVING THE PAGE | lock |
| 2 | SWITCHING PAGES | unlock |
| 3 | MOVING THE OBJECT GROUP | lock |
| ... | ... | ... |

FIG. 17

| STATE | TERMINAL ID | DESTINATION NAME |
|---|---|---|
| 📞 | 01ab | MR. AB, TOKYO BRANCH, JAPAN |
| 📞 | 01ba | TERMINAL BA, BEIJING BRANCH, CHINA |
| ⋮ | | |
| 📞 | 01db | MR. DB, BERLIN BRANCH, EUROPE |
| ⋮ | | |

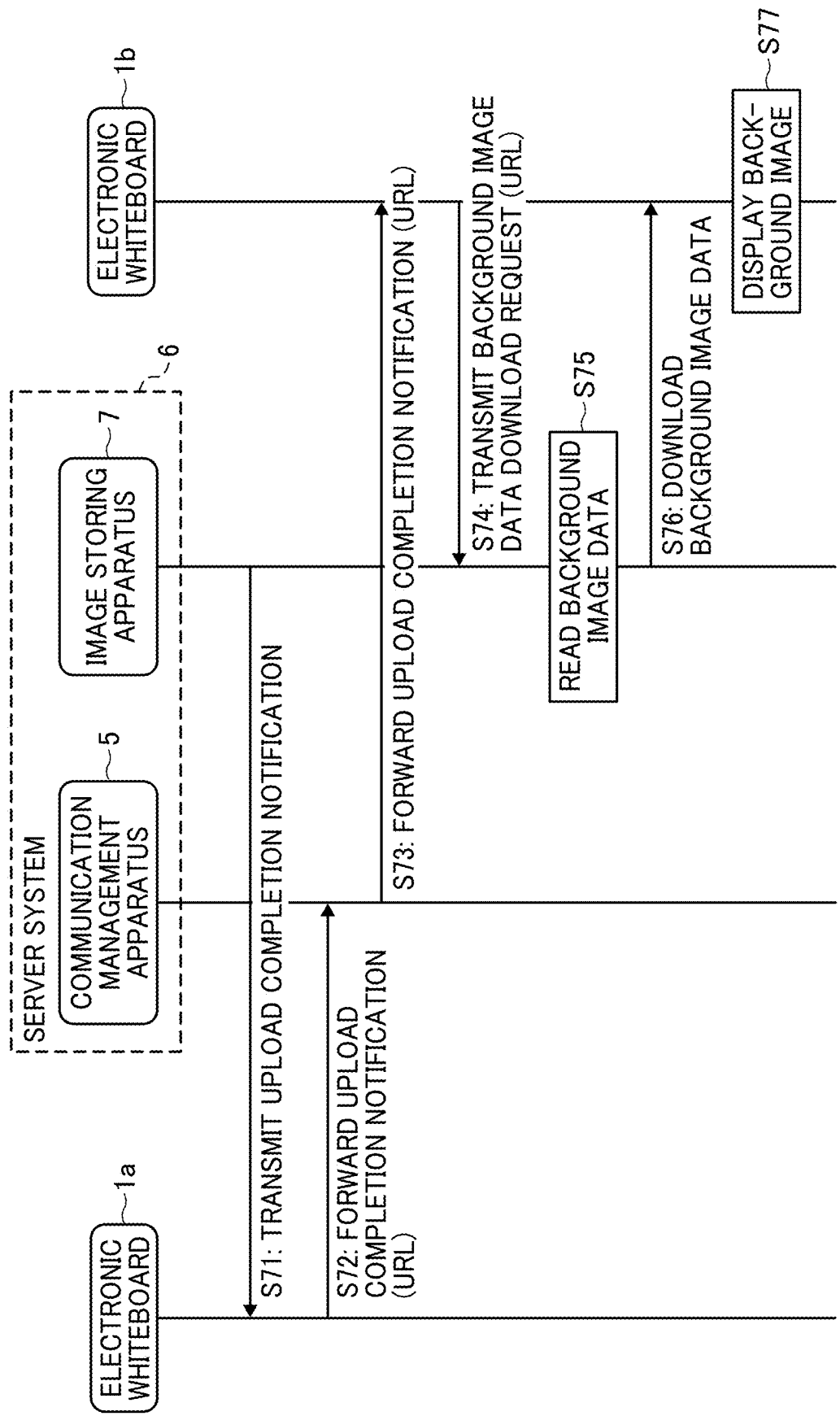

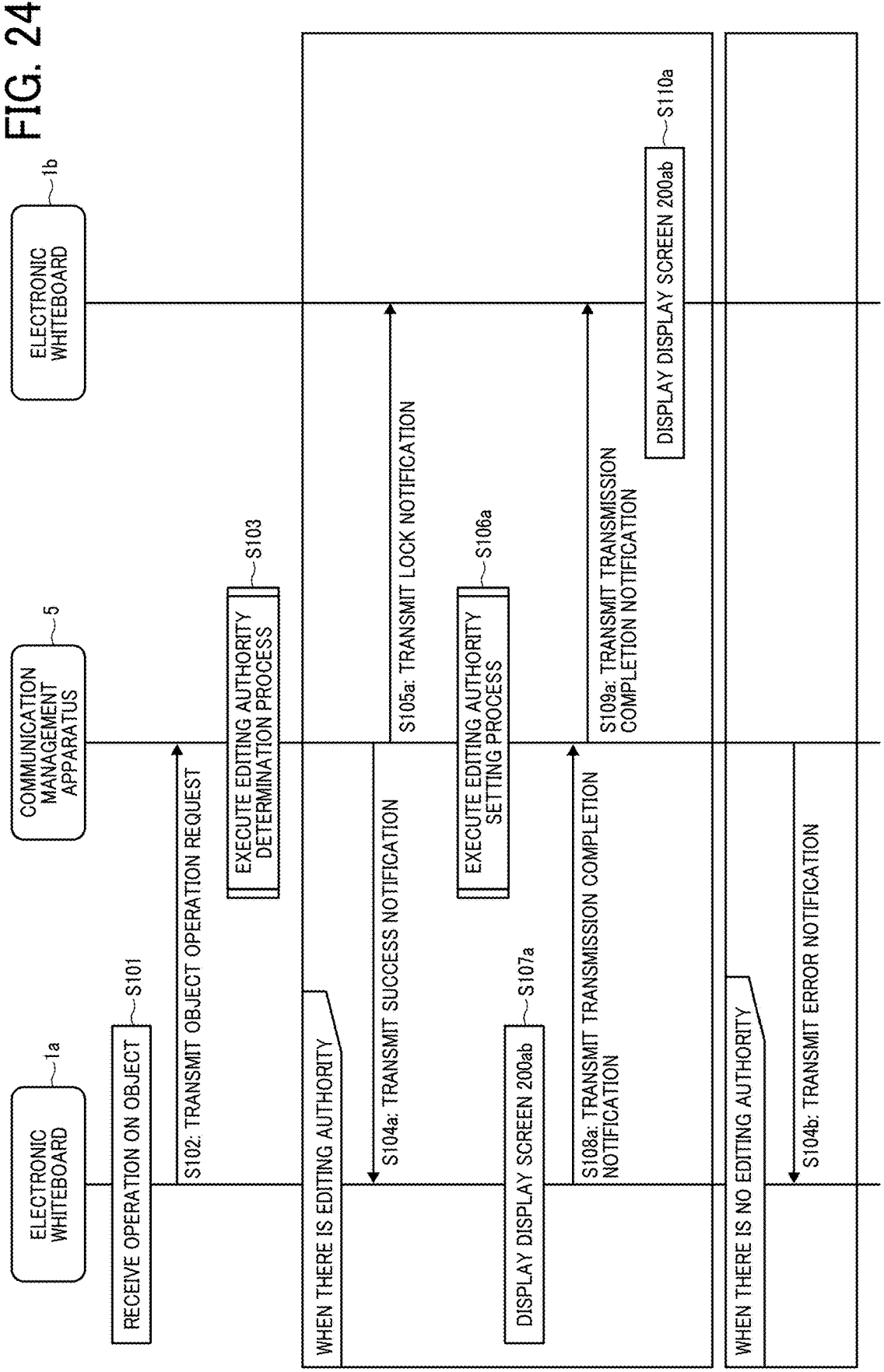

COMMUNICATION MANAGEMENT APPARATUS, COMMUNICATION SYSTEM, COMMUNICATION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-044586 filed on Mar. 13, 2020 in the Japan Patent Office, the entire disclosure of which is hereby incorporated by reference herein.

BACKGROUND

Technical Field

The present invention relates to a communication management apparatus, a communication system, a communication method, and a non-transitory recording medium.

Description of the Related Art

There is a widely used communication system that enables communication between remote sites via a communication network such as the Internet. An example of such a communication system is a conference system that enables a remote conference. In a typical conference system, image data being held or displayed by a communication terminal used by one of two parties participating in the remote conference is transmitted, via the communication network, to a communication terminal used by the other party, thereby enabling the two parties to share the image data. With this system, the conference between the remote sites is held in a setting close to that of a conference held in the same physical space.

Further, a communication terminal such as an electronic whiteboard has been used which displays an image on a display so that a user renders a stroke image of a letter, character, number, or figure, for example, on the image. The stroke image is rendered based on stroke data including coordinate data. The communication terminal generates the stroke data by electronically converting content rendered on the display by a user moving an electronic pen or a hand over the display while keeping the electronic pen or the hand in contact with the display. When the stroke image is rendered on one communication terminal, stroke data for reproducing the stroke image is transmitted from the one communication terminal to the other communication terminal via the communication network. Thereby, the other communication terminal displays the same stroke image.

To prevent the communication terminals from contending with each other for operation in this case, there is a technique of notifying in advance the user of one of the communication terminals of the user operation taking place on the other communication terminal.

For example, however, if the communication terminals perform respective operations on the same stroke image, data items corresponding to the respective operations are processed in the order of data arrival to a communication management apparatus that manages shared data. Consequently, the operation result may not reflect the intention of either of the users. This issue may be addressed by restricting the operation on individual stroke data being operated with one of the communication terminals. In this case, however, the other communication terminal may perform an operation on the entire screen, such as a page switching operation. Restricting the operation on individual data alone is therefore insufficient to prevent inconsistency in editing.

SUMMARY

In one embodiment of this invention, there is provided an improved communication management apparatus that includes, for example, a memory and circuitry. The memory stores a hierarchical data structure in which each page of a plurality of pages forming a display screen shared by a plurality of communication terminals is associated with one or more objects included in the each page. The circuitry receives, from one communication terminal of the plurality of communication terminals, an operation request that requests an operation on a particular object of the one or more objects. When editing of the particular object and editing of data in a lower layer associated with a higher layer of the particular object are both allowed, the circuitry transmits a success notification to the one communication terminal to notify success of the operation on the particular object.

In one embodiment of this invention, there is provided an improved communication system that includes, for example, the above-described communication management apparatus and a communication terminal that shares a display screen with another communication terminal. The communication terminal includes another circuitry that receives an operation request that requests an operation on a particular object of one or more objects included in a page forming the display screen. In response to receipt, from the communication management apparatus, of a success notification that notifies success of the operation on the particular object, the another circuitry causes a display to display the display screen to reflect the operation according to the operation request in the display screen.

In one embodiment of this invention, there is provided an improved communication method that includes, for example, storing, in a memory, a hierarchical data structure in which each page of a plurality of pages forming a display screen shared by a plurality of communication terminals is associated with one or more objects included in the each page, receiving, from one communication terminal of the plurality of communication terminals, an operation request that requests an operation on a particular object of the one or more objects, and when editing of the particular object and editing of data in a lower layer associated with a higher layer of the particular object are both allowed, transmitting a success notification to the one communication terminal to notify success of the operation on the particular object.

In one embodiment of this invention, there is provided a non-transitory recording medium storing a plurality of instructions which, when executed by one or more processors, cause the processors to perform the above-described communication method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A and 6B are diagrams illustrating an example of the functional configuration of the communication system of the embodiment;

FIG. 8 is a diagram schematically illustrating an example of operation information stored in an operation information management database of the embodiment;

FIG. 9 is a conceptual diagram illustrating an example of an authentication management table of the embodiment;

FIG. 10 is a conceptual diagram illustrating an example of a terminal management table of the embodiment;

FIG. 11 is a conceptual diagram illustrating an example of a destination list management table of the embodiment;

FIG. 12 is a conceptual diagram illustrating an example of a session management table of the embodiment;

FIG. 13 is a conceptual diagram illustrating an example of a relay apparatus management table of the embodiment;

FIG. 14 is a conceptual diagram illustrating an example of a shared data management table of the embodiment;

FIG. 15 is a conceptual diagram illustrating an example of a lower-layer setting condition management table of the embodiment;

FIG. 17 is a diagram illustrating an example of a destination list screen displayed on one of the electronic whiteboards of the embodiment;

FIGS. 19, 20, and 21 are sequence diagrams illustrating an example of a data sharing process between the electronic whiteboards in the communication system of the embodiment;

FIG. 24 is a sequence diagram illustrating an example of a rendering process performed on one of the electronic whiteboards in the communication system of the embodiment in accordance with editing authority;

Figure 1:
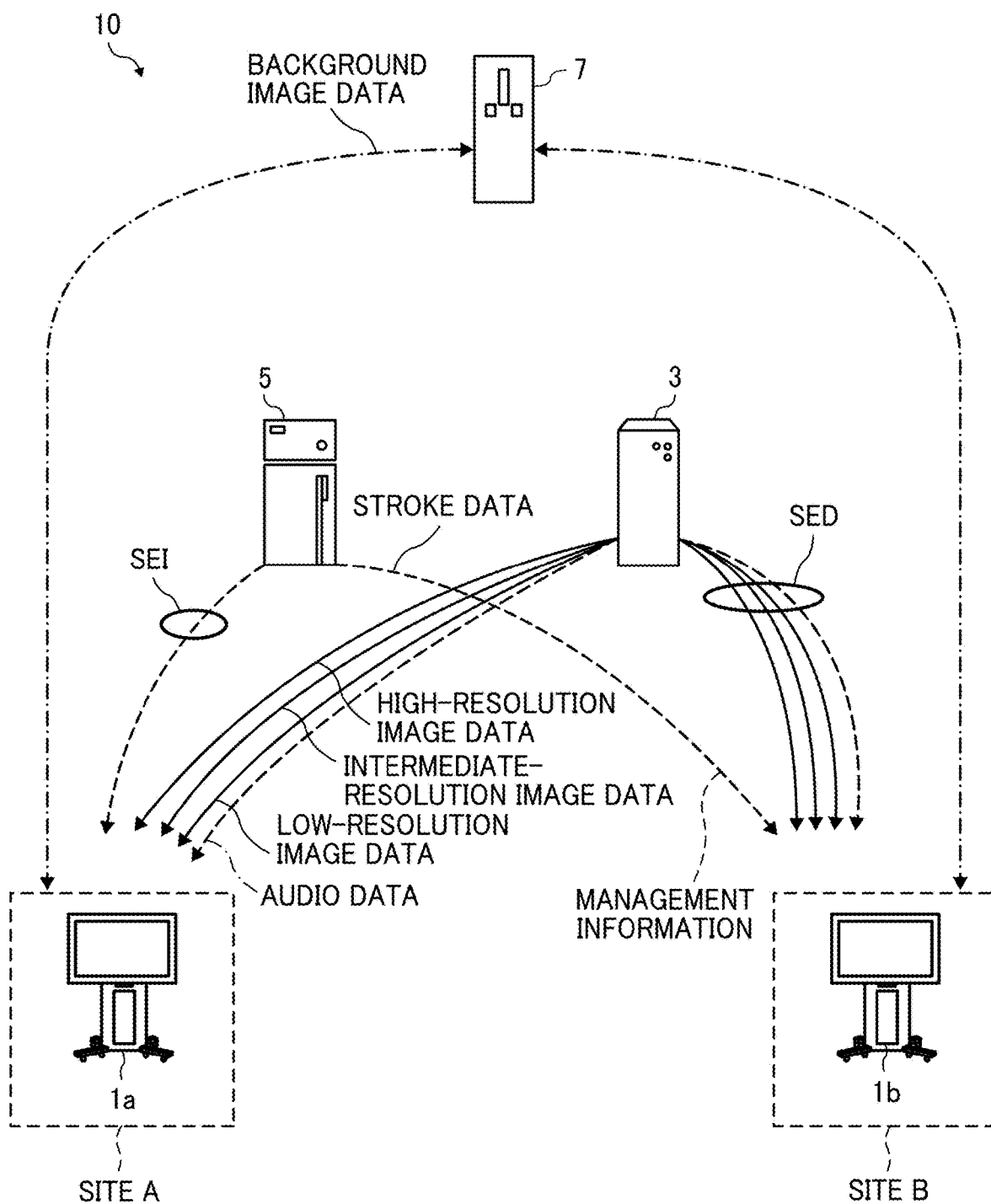
FIG. 1 is a schematic diagram illustrating an example of communication routes in a communication system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment for implementing the present invention will be described below with reference to the drawings.
Schematic Configuration of Communication System
Communication Routes With reference to FIG. 1, a description will be given of a communication system 10 of the embodiment that enables a video conference between a plurality of electronic whiteboards 1a and 1b, while allowing users to perform rendering on the electronic whiteboards 1a and 1b.

FIG. 1 is a schematic diagram illustrating an example of communication routes in the communication system 10 of the embodiment. The video conference may also be referred to as the television (TV) conference or a remote conference, for example. A conference such as the video conference, the TV conference, or the remote conference is an example of a session for sharing image data and stroke data between a plurality of terminals. For example, the session for sharing the image data and the stroke data may be a session other than the conference, such as distance learning, remote diagnosis, meeting, or simple conversation. Further, the session for sharing the image data and the stroke data may be used for unidirectional provision of information.

The communication system 10 includes the plurality of electronic whiteboards 1a and 1b, at least one relay apparatus 3, a communication management apparatus 5, and an image storing apparatus 7. The electronic whiteboards 1a and 1b communicate therebetween image data and audio data for communication and content data such as image data and stroke data for sharing. The stroke data is data for reproducing (i.e., duplicating) a stroke image, and includes coordinate data, line width data, line color data, vector data, and data representing the writing pressure applied to render a stroke, for example. The stroke data is transmitted and received between the electronic whiteboards 1a and 1b as a serialized character string. Each of the electronic whiteboards 1a and 1b transmits and receives therebetween the image data and the audio data for communication to reproduce a site image and sound of the site at which the other electronic whiteboard 1a or 1b is located, thereby performing remote video communication.

With the electronic whiteboards 1a and 1b transmitting and receiving therebetween the image data of a background image for sharing, the users of the communication system 10 (i.e., the participants of the video conference) share the same background image. The background image is an image displayed on respective displays of the electronic whiteboards 1a and 1b. In the following description, the electronic whiteboards 1a and 1b may be collectively referred to as the electronic whiteboards 1. The background image includes the image of a material for a conference, for example, which is read from an electronic file and displayed on a display 180 (see FIG. 2) of the electronic whiteboard 1. The image data of the background image is transmitted and received in a file format such as the joint photographic experts group (JPEG) format, for example. The electronic whiteboards 1a and 1b further transmit and receive therebetween the stroke data of the stroke image for sharing, thereby enabling the users of the communication system 10 (i.e., the participants of the video conference) to share the same stroke image. The stroke image is the image of a line, for example, which is rendered based on a handwritten stroke made by a user with an electronic pen, for example. The stroke image is displayed based on the stroke data, which represents points identifying coordinates on the display 180.

The electronic whiteboards 1 included in the communication system 10 are not limited to the two electronic whiteboards 1a and 1b, and thus the communication system 10 may include three or more electronic whiteboards 1. Each of the electronic whiteboards 1 is an example of a communication terminal having functions such as a communication function, a rendering function, and a display function. For example, the communication terminal may be a personal computer (PC), a smartphone, a tablet terminal, a smartwatch, a car navigation terminal, a gaming device, or a telepresence robot installed with an application program compatible with the communication system 10. Further, the communication terminal may be medical equipment, in which case the background image may be the image of a patient.

FIG. 1 illustrates the electronic whiteboards 1a and 1b each as an example of an electronic whiteboard with a video conference function. The site image, which is based on site image data, may be a video or still image.

An electronic whiteboard as a source of a video conference start request will be referred to as the starting terminal, and an electronic whiteboard as a destination to which the video conference start request is transmitted or relayed will be referred to as the destination terminal. In FIG. 1, the electronic whiteboard 1a at a site A and the electronic whiteboard 1b at a site B are illustrated as the starting terminal and the destination terminal, respectively. When the video conference start request is transmitted from the electronic whiteboard 1b, however, the electronic whiteboard 1b serves as the starting terminal, and the electronic whiteboard 1a serves as the destination terminal. The electronic whiteboards 1a and 1b may be used not only in communication between a plurality of offices and communication between different rooms in the same office but also in communication in the same room, communication between an indoor space and an outdoor space, and communication between an outdoor space and another outdoor space.

The relay apparatus 3, which is implemented by a computer, performs a process of relaying the content data for communication between the electronic whiteboards 1a and 1b. The communication management apparatus 5, which is implemented by a computer, performs login authentication of the electronic whiteboards 1a and 1b and centrally manages the respective communication states of the electronic whiteboards 1a and 1b, the communication state of the relay apparatus 3, and a destination list. The communication management apparatus 5 further relays the stroke data for sharing between the electronic whiteboards 1a and 1b.

The image storing apparatus 7, which is implemented by a computer, stores the image data of the background image for sharing uploaded from the electronic whiteboard 1a and downloads the image data to the electronic whiteboard 1b, and vice versa. That is, the image storing apparatus 7 stores the image data uploaded from the electronic whiteboard 1b and downloads the image data to the electronic whiteboard 1a.

Each of the relay apparatus 3, the communication management apparatus 5, and the image storing apparatus 7 may be implemented by a single computer, or may be implemented by a plurality of computers to which units (i.e., functions or devices) of the apparatus are divided and allocated as desired. The communication management apparatus 5 and the image storing apparatus 7 form a server system 6 (see FIG. 5) that manages the data shared by the electronic whiteboards 1a and 1b. The server system 6 may be implemented by a single computer including the units (i.e., functions or devices) of the communication management apparatus 5 and the image storing apparatus 7. Further, instead of the communication management apparatus 5, the image storing apparatus 7 may relay the stroke data for sharing between the electronic whiteboards 1a and 1b.

In the communication system 10, a management information session SEI is established between the electronic whiteboards 1a and 1b to transmit and receive therebetween various management information via the communication management apparatus 5. Further, four sessions are established between the electronic whiteboards 1a and 1b to transmit and receive therebetween four types of data: high-resolution site image data, intermediate-resolution site image data, low-resolution site image data, and audio data, via the relay apparatus 3. In FIG. 1, the four sessions are collectively illustrated as an image and audio data session SED. The image and audio data session SED does not necessarily include four sessions, and may include three or less sessions or five or more sessions. Further, the communication session may be established directly between the starting terminal and the destination terminal without via the relay apparatus 3. Further, in the communication system 10, the communication management apparatus 5 may have the function of the relay apparatus 3 such that the image and audio data session SED is established between the electronic whiteboards 1a and 1b via the communication management apparatus 5. Further, in the communication system 10, the stroke data is transmitted and received between the electronic whiteboards 1a and 1b via the management information session SEI.

The image resolution of the site image data in the embodiment will be described.

The low-resolution site image data, which forms a base image, includes 160 pixels in the horizontal direction by 120 pixels in the vertical direction, for example. The intermediate-resolution site image data includes 320 pixels in the horizontal direction by 240 pixels in the vertical direction, for example. The high-resolution site image data includes 640 pixels in the horizontal direction by 480 pixels in the vertical direction, for example. When the site image data routes through a narrow band path, low-quality image data including the low-resolution site image data for forming the base image is relayed. When the site image data routes through a relatively wide band path, intermediate-quality image data including the low-resolution site image data for forming the base image and the intermediate-resolution site image data is relayed. When the site image data routes through a substantially wide band path, high-quality image data including the low-resolution site image data for forming the base image, the intermediate-resolution site image data, and the high-resolution site image data is relayed. The audio data is smaller in data size than the site image data, and thus is relayed even through a narrow band path.

Use of Electronic Whiteboard

Figure 2:
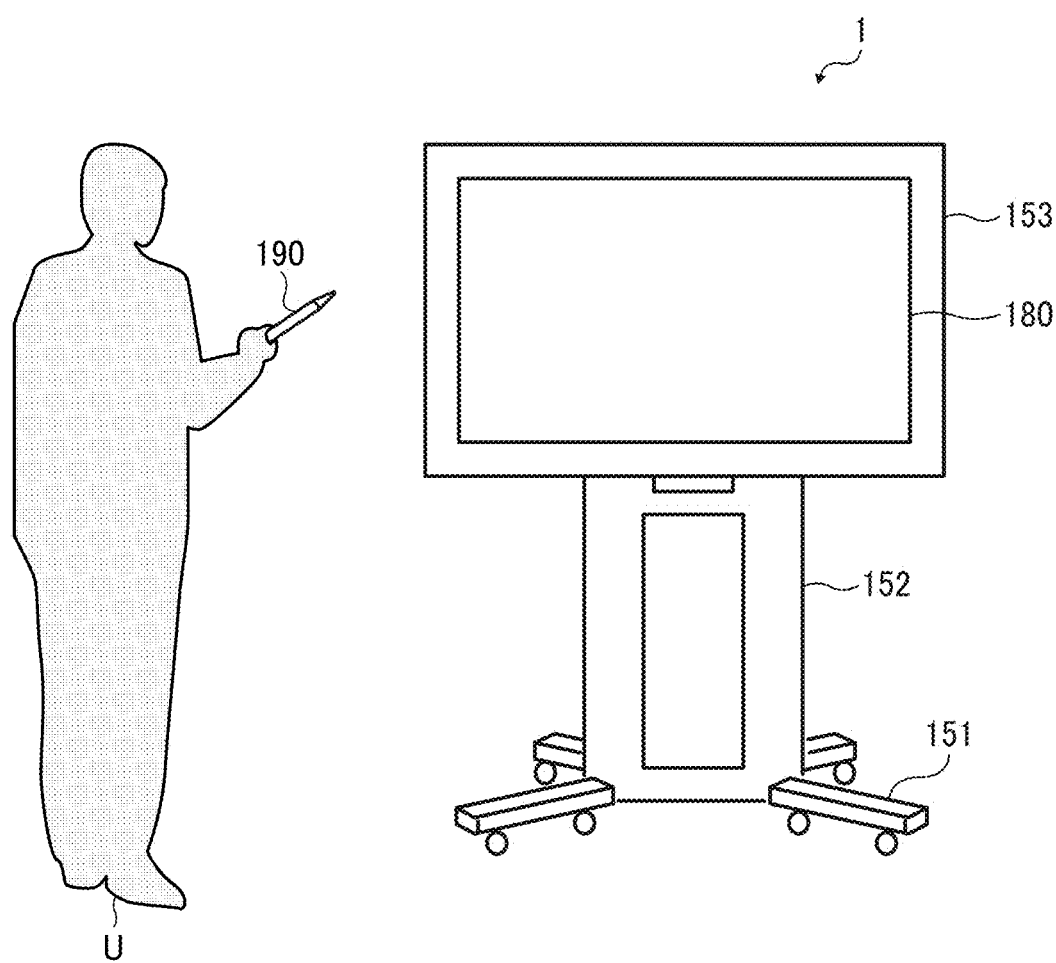
FIG. 2 is a diagram illustrating use of an electronic whiteboard included in the communication system of the embodiment.

FIG. 2 is a diagram illustrating use of the electronic whiteboard 1 of the embodiment. As illustrated in FIG. 2, the electronic whiteboard 1 includes a foot 151, a support post 152, a main unit 153, and the display 180. A lower side of the foot 151 is equipped with a plurality of casters, and an upper side of the foot 151 is equipped with the support post 152. The main unit 153 is disposed on an upper side of the support post 152, and has a front surface equipped with the display 180. The main unit 153 includes therein a later-described central processing unit (CPU) 101 (see FIG. 3). A user U inputs (i.e., renders) the stroke image of a letter or character, for example, on the display 180 with an electronic pen 190.

Hardware Configurations

Figure 3:
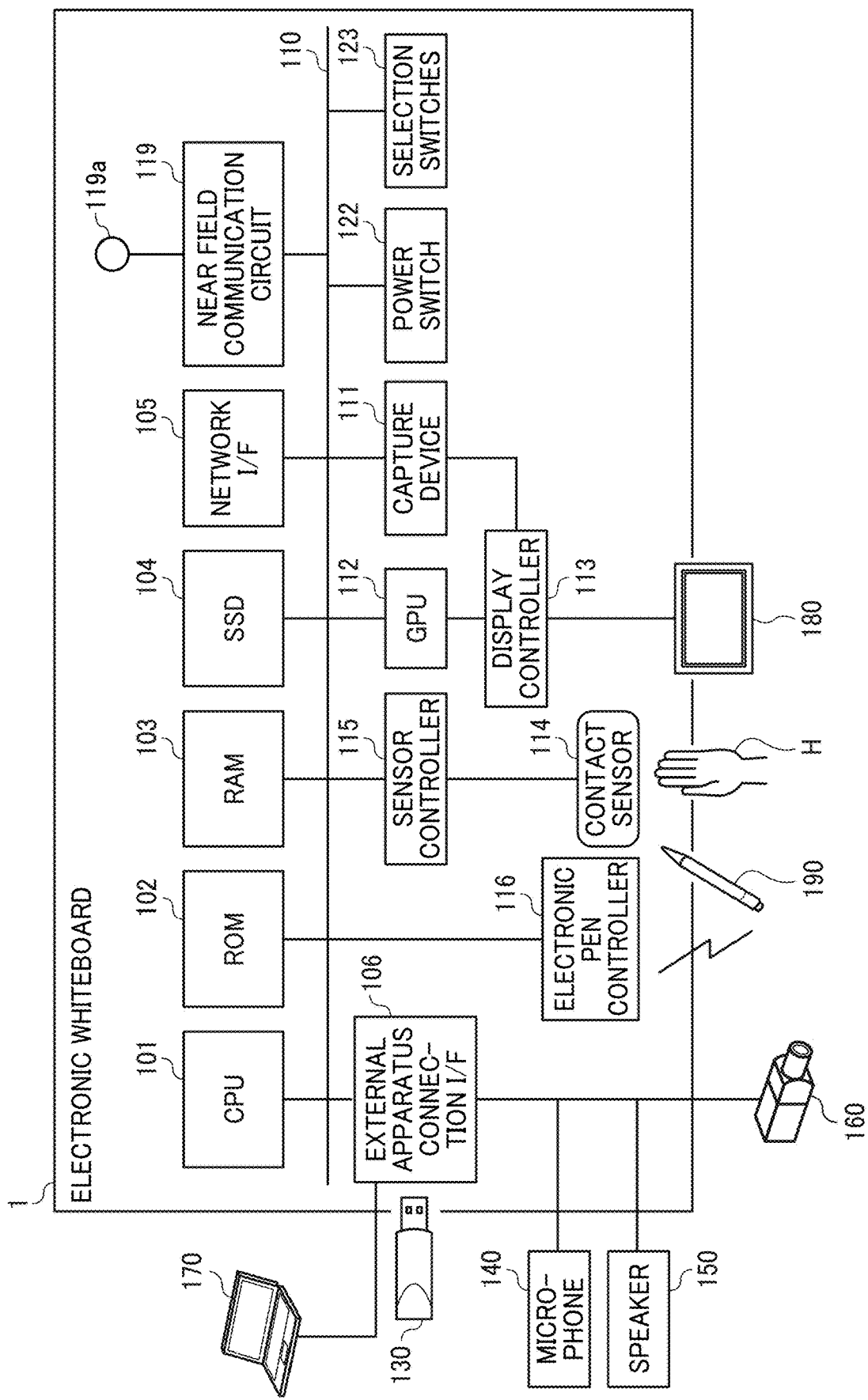
FIG. 3 is a diagram illustrating an example of the hardware configuration of the electronic whiteboard of the embodiment.
Figure 4:
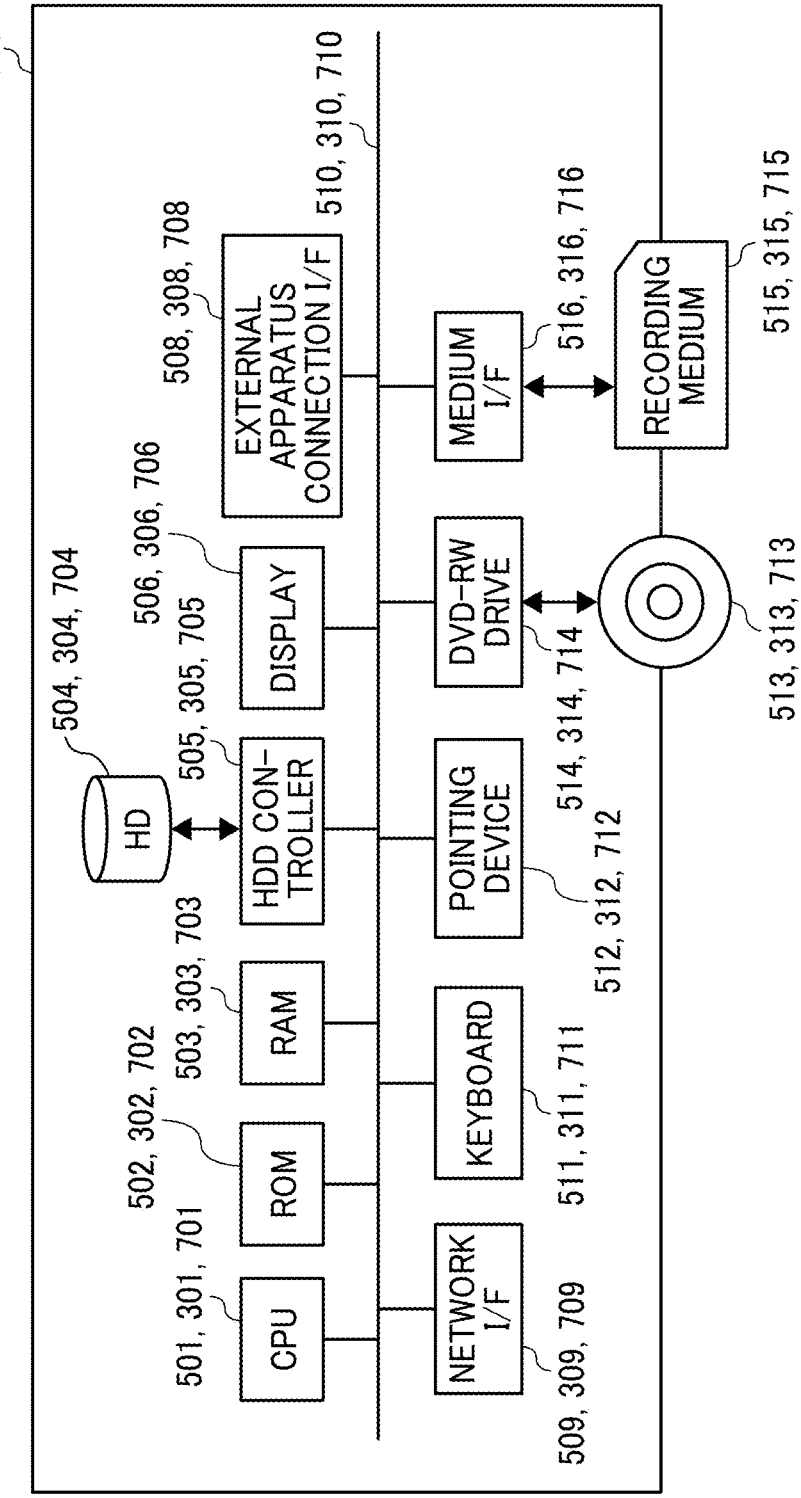
FIG. 4 is a diagram illustrating an example of the hardware configuration of each of a communication management apparatus, a relay apparatus, and an image storing apparatus included in the communication system of the embodiment.

With reference to FIGS. 3 and 4, a description will be given of respective hardware configurations of apparatuses and terminals forming the communication system 10. A component may be added to or removed from each of the hardware configurations in FIGS. 3 and 4 as necessary.

Hardware Configuration of Electronic Whiteboard

FIG. 3 is a diagram illustrating an example of the hardware configuration of the electronic whiteboard 1 of the embodiment. As illustrated in FIG. 3, the electronic whiteboard 1 includes the CPU 101, a read only memory (ROM) 102, a random access memory (RAM) 103, a solid state drive (SSD) 104, a network interface (I/F) 105, and an external apparatus connection I/F 106.

The CPU 101 controls the overall operation of the electronic whiteboard 1. The ROM 102 is a nonvolatile memory that stores a program for the CPU 101 and a program used to drive the CPU 101 such as an initial program loader (IPL). The RAM 103 is a volatile memory used as a work area for the CPU 101. The SSD 104 is a high-capacity memory that stores various data of a program for the electronic whiteboard 1, for example. The network I/F 105 is a communication interface for connecting the electronic whiteboard 1 to a communication network 100 (see FIG. 5) to perform communication. The external apparatus connection I/F 106 is an interface for connecting the electronic whiteboard 1 to various external apparatuses. The external apparatuses in this case include a universal serial bus (USB) memory 130 and other external apparatuses such as a microphone 140, a speaker 150, and a camera 160, for example.

The electronic whiteboard 1 further includes a capture device 111, a graphics processing unit (GPU) 112, a display controller 113, a contact sensor 114, a sensor controller 115, an electronic pen controller 116, a near field communication circuit 119, an antenna 119a for the near field communication circuit 119, a power switch 122, and selection switches 123.

The capture device 111 displays image data (i.e., image information) on a display of an external PC 170, for example, as a still or video image. The GPU 112 is a semiconductor chip processor dedicated to graphics processing. The display controller 113 controls and manages screen display to output an image from the GPU 112 to the display 180, for example. The contact sensor 114 detects the contact of the electronic pen 190 or a hand H of a user, for example, on the display 180. The sensor controller 115 controls the processing of the contact sensor 114. The contact sensor 114 performs input and detection of coordinates in accordance with an infrared blocking method. In this method of inputting and detecting coordinates, two light emitting and receiving devices disposed on opposite end portions of an upper area of the display 180 radiate a plurality of infrared rays parallel to the display 180, and receive rays of light reflected by a reflecting member disposed around the display 180 and returning on optical paths of the rays radiated by the two light emitting and receiving devices. The contact sensor 114 outputs, to the sensor controller 115, identifiers (IDs) of the infrared rays radiated by the two light emitting and receiving devices and blocked by an object. Then, the sensor controller 115 identifies the position of the coordinates corresponding to the position of contact of the object on the display 180. The electronic pen controller 116 communicates with the electronic pen 190 to determine contact or non-contact of the head or end of the electronic pen 190 on the display 180. The near field communication circuit 119 is a communication circuit conforming to a standard such as the near field communication (NFC) or Bluetooth (registered trademark) standard. The power switch 122 is a switch for switching on or off power supply to the electronic whiteboard 1. The selection switches 123 are switches for adjusting parameters such as the brightness and the color tone of the image displayed on the display 180, for example.

The electronic whiteboard 1 further includes a bus line 110, which includes address buses and data buses to electrically connect the CPU 101 and the other components in FIG. 3 to each other.

The contact sensor 114 is not limited to the infrared blocking method, and may employ a different type of detecting device, such as a capacitance touch panel that identifies the contact position by detecting a change in capacitance, a resistive touch panel that identifies the contact position by detecting a change in voltage of two resistance films facing each other, or an electromagnetic induction touch panel that identifies the contact position by detecting electromagnetic induction caused by contact of an object on a display. Further, the electronic pen controller 116 may determine contact or non-contact of a part of the electronic pen 190 held by the user or another part of the electronic pen 190, as well as the head or end of the electronic pen 190.

Hardware Configurations of Communication Management Apparatus, Relay Apparatus, and Image Storing Apparatus FIG. 4 is a diagram illustrating an example of the hardware configuration of each of the communication management apparatus 5, the relay apparatus 3, and the image storing apparatus 7 of the embodiment. A computer as an example of the communication management apparatus 5 includes a CPU 501, a ROM 502, a RAM 503, a hard disk (HD) 504, a hard disk drive (HDD) controller 505, a display 506, an external apparatus connection I/F 508, a network I/F 509, a keyboard 511, a pointing device 512, a digital versatile disc rewritable (DVD-RW) drive 514, a medium I/F 516, and a bus line 510.

The CPU 501 controls the overall operation of the communication management apparatus 5. The ROM 502 is a nonvolatile memory that stores a program used to drive the CPU 501 such as the IPL. The RAM 503 is a volatile memory used as a work area for the CPU 501. The HD 504 is a high-capacity memory that stores various data of a communication management program, for example. The HDD controller 505 controls writing and reading of various data to and from the HD 504 under the control of the CPU 501. The display 506 displays various information such as a cursor, menus, windows, text, and images. The external apparatus connection I/F 508 is an interface for connecting the communication management apparatus 5 to various external apparatuses. The network I/F 509 is an interface for performing data communication via the communication network 100 such as the Internet. The keyboard 511 is an input device including a plurality of keys for inputting text, numerical values, and various instructions, for example. The pointing device 512 is an input device used to select and execute various instructions, select a processing target, and move the cursor, for example. The DVD-RW drive 514 controls writing (i.e., storage) and reading of data to and from a DVD-RW 513. The DVD-RW 513 may be replaced by a DVD-recordable (DVD-R), for example. Further, the DVD-RW drive 514 may be replaced by a Blu-ray (registered trademark) drive that controls writing (i.e., storage) and reading of data to and from a disc such as a Blu-ray disc recordable erasable (BD-RE) or a compact disc rewritable (CD-RW) drive that controls writing (i.e., storage) and reading of data to and from a disc such as a CD-RW. The medium I/F 516 controls writing (i.e., storage) and reading of data to and from a recording medium 515 such as a flash memory. The bus line 510 includes address buses and data buses to electrically connect the CPU 501 and the other components in FIG. 4 to each other.

The relay apparatus 3 is implemented by a typical computer. As illustrated in FIG. 4, the relay apparatus 3 includes a CPU 301, a ROM 302, a RAM 303, an HD 304, an HDD controller 305, a display 306, an external apparatus connection I/F 308, a network I/F 309, a keyboard 311, a pointing device 312, a DVD-RW drive 314, a medium I/F 316, and a bus line 310. These components are similar in configuration to the CPU 501, the ROM 502, the RAM 503, the HD 504, the HDD controller 505, the display 506, the external apparatus connection I/F 508, the network I/F 509, the keyboard 511, the pointing device 512, the DVD-RW drive 514, the medium I/F 516, and the bus line 510 of the communication management apparatus 5, and thus description thereof will be omitted. In the relay apparatus 3, however, the HD 304 stores a relay program.

The image storing apparatus 7 is implemented by a typical computer. As illustrated in FIG. 4, the image storing apparatus 7 includes a CPU 701, a ROM 702, a RAM 703, an HD 704, an HDD controller 705, a display 706, an external apparatus connection I/F 708, a network I/F 709, a keyboard 711, a pointing device 712, a DVD-RW drive 714, a medium I/F 716, and a bus line 710. These components are similar in configuration to the CPU 501, the ROM 502, the RAM 503, the HD 504, the HDD controller 505, the display 506, the external apparatus connection I/F 508, the network I/F 509, the keyboard 511, the pointing device 512, the DVD-RW drive 514, the medium I/F 516, and the bus line 510 of the communication management apparatus 5, and thus description thereof will be omitted. In the image storing apparatus 7, however, the HD 704 stores an image storage program.

Each of the above-described programs may be distributed as recorded on a computer readable recording medium in an installable or executable file format. Examples of the recording medium include a compact disc recordable (CD-R), a DVD, a Blu-ray disc, a secure digital (SD) card, and a USB memory. The recording medium may be shipped to the market as a program product. For example, the communication management apparatus 5 implements a communication method of the present invention by executing a program of the present invention.

General Arrangement of Communication System

A general arrangement of the communication system 10 will be described with FIG. 5.

Figure 5:
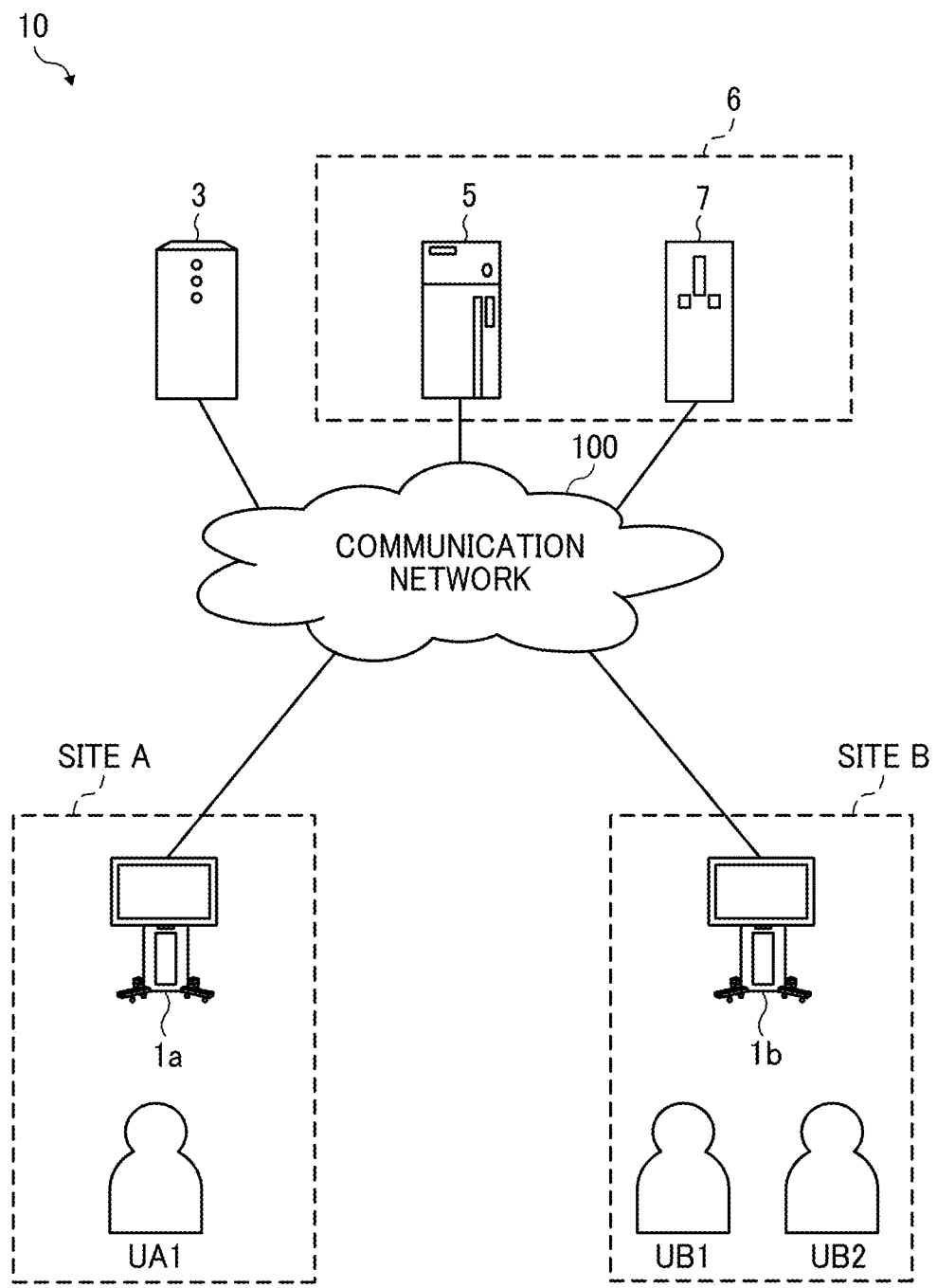
FIG. 5 is a diagram illustrating an example of the system configuration of the communication system of the embodiment.

FIG. 5 is a diagram illustrating an example of the system configuration of the communication system 10 of the embodiment. In FIG. 5, the electronic whiteboard 1a and the electronic whiteboard 1b are located at the site A and the site B, respectively. The site A may be a Tokyo branch in Japan, and the site B may be a Beijing branch in China, for example. It is assumed here that the electronic whiteboard 1a is used by a user UA1 at the site A, and that the electronic whiteboard 1b is used by users UB1 and UB2 at the site B.

The electronic whiteboards 1a and 1b, the relay apparatus 3, the communication management apparatus 5, and the image storing apparatus 7 transmit and receive data to and from each other via the communication network 100 such as the Internet or a local area network (LAN), for example. The communication via the communication network 100 is not limited to wired communication, and wireless communication conforming to a standard such as the wireless fidelity (Wi-Fi, registered trademark) standard may take place in some part of the communication network 100.

Functional Configuration of Communication System

A functional configuration of the communication system 10 of the embodiment will be described with FIGS. 6A to 15.

Figure 6B:
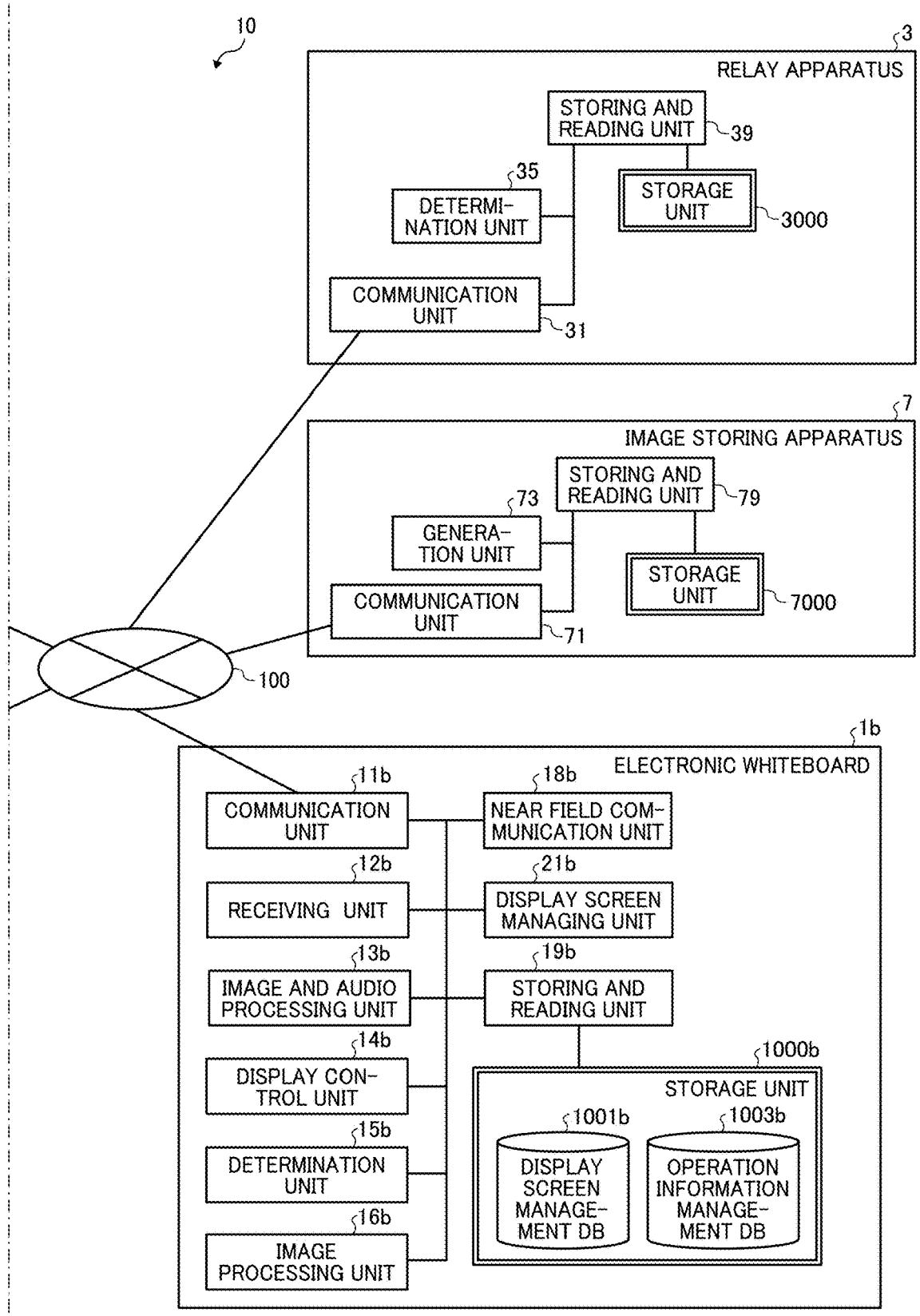

FIGS. 6A and 6B are diagrams illustrating an example of the functional configuration of the communication system 10 of the embodiment. FIGS. 6A and 6B illustrate parts of the terminals, apparatuses, and server system in FIG. 5 related to later-described processes and operations.

Functional Configuration of Electronic Whiteboard

A functional configuration of each of the electronic whiteboards 1a and 1b will be described with FIGS. 6A and 6B. Since the electronic whiteboards 1a and 1b have similar functions, the following description will be given of the functions of the electronic whiteboard 1 with omission of the suffix a or b after each reference numeral.

The electronic whiteboard 1 includes a communication unit 11, a receiving unit 12, an image and audio processing unit 13, a display control unit 14, a determination unit 15, an image processing unit 16, a near field communication unit 18, a display screen managing unit 21, and a storing and reading unit 19. Each of these units is a function or functional unit implemented when at least one of the components illustrated in FIG. 3 operates in response to a command from the CPU 101 in accordance with the program deployed on the RAM 103 from the SSD 104. The electronic whiteboard 1 further includes a storage unit 1000 implemented by the RAM 103, the SSD 104, or the USB memory 130 illustrated in FIG. 3. The storage unit 1000 stores a display screen management database (DB) 1001 and an operation information management DB 1003.

The communication unit 11 is a function implemented by a command from the CPU 101 in FIG. 3 and the network I/F 105 in FIG. 3 to transmit and receive various data and information to and from another terminal, apparatus, or system via the communication network 100. The communication unit 11 also functions as a starting unit, for example, to perform a process of starting communication with another electronic whiteboard 1. The communication unit 11 further transmits and receives display screen data to be displayed on the display 180 to and from another electronic whiteboard 1 via the communication management apparatus 5.

The receiving unit 12 is implemented by a command from the CPU 101 in FIG. 3 and the contact sensor 114 and the electronic pen controller 116 in FIG. 3 to receive various inputs made by the user with the electronic pen 190, for example.

The image and audio processing unit 13 is implemented by a command from the CPU 101 in FIG. 3 to perform a major process of the video conference function. For example, based on signals output from the microphone 140 and the camera 160, the image and audio processing unit 13 performs digital processing such as encoding of the site image data and the audio data. Further, for example, based on the site image data and the audio data received by the communication unit 11, the image and audio processing unit 13 generates an image signal and an audio signal. The image and audio processing unit 13 further performs a process of combining site image data items of different resolutions, for example.

The display control unit 14 is a function implemented by a command from the CPU 101 in FIG. 3 and the display controller 113 in FIG. 3 to perform control for outputting signals such as the image signal to the display 180. For example, the display control unit 14 controls the display 180 to display a display screen based on the display screen data generated by the image processing unit 16.

The determination unit 15 is a function implemented by a command from the CPU 101 in FIG. 3 to make various determinations.

The image processing unit 16 is a function implemented by a command from the CPU 101 in FIG. 3 and the capture device 111 in FIG. 3 to perform a major process of an electronic whiteboard function. The image processing unit 16 generates the stroke data and the stroke image based on the stroke made with the electronic pen 190, for example, and received by the receiving unit 12, for example. The image processing unit 16 further generates the stroke image based on the stroke data received by the communication unit 11, for example. The image processing unit 16 further generates the display screen data including the generated stroke image, for example.

The near field communication unit 18 is a function implemented by a command from the CPU 101 in FIG. 3 and the near field communication circuit 119 and the antenna 119a in FIG. 3 to provide data to or acquire data from another terminal having a near field communication unit, such as an integrated circuit (IC) card or a smartphone, in near field wireless communication.

The display screen managing unit 21 is a function implemented by a command from the CPU 101 in FIG. 3 to manage screen data forming the display screen shared with another electronic whiteboard 1.

The storing and reading unit 19 is a function implemented by a command from the CPU 101 in FIG. 3 to store various data in the storage unit 1000 and read therefrom various data. Each time the site image data and the audio data are received in the communication with another terminal, the site image data and audio data stored in the storage unit 1000 are overwritten with the newly received site image data and audio data. The display 180 displays an image based on the site image data before being overwritten with the newly-received site image data, and the speaker 150 outputs sound based on the audio data before being overwritten with the newly-received audio data. The storage unit 1000 further stores the stroke data of the stroke image rendered on the display 180 and the background image data of the background image displayed on the display 180.

Display Screen Information

Figure 7:
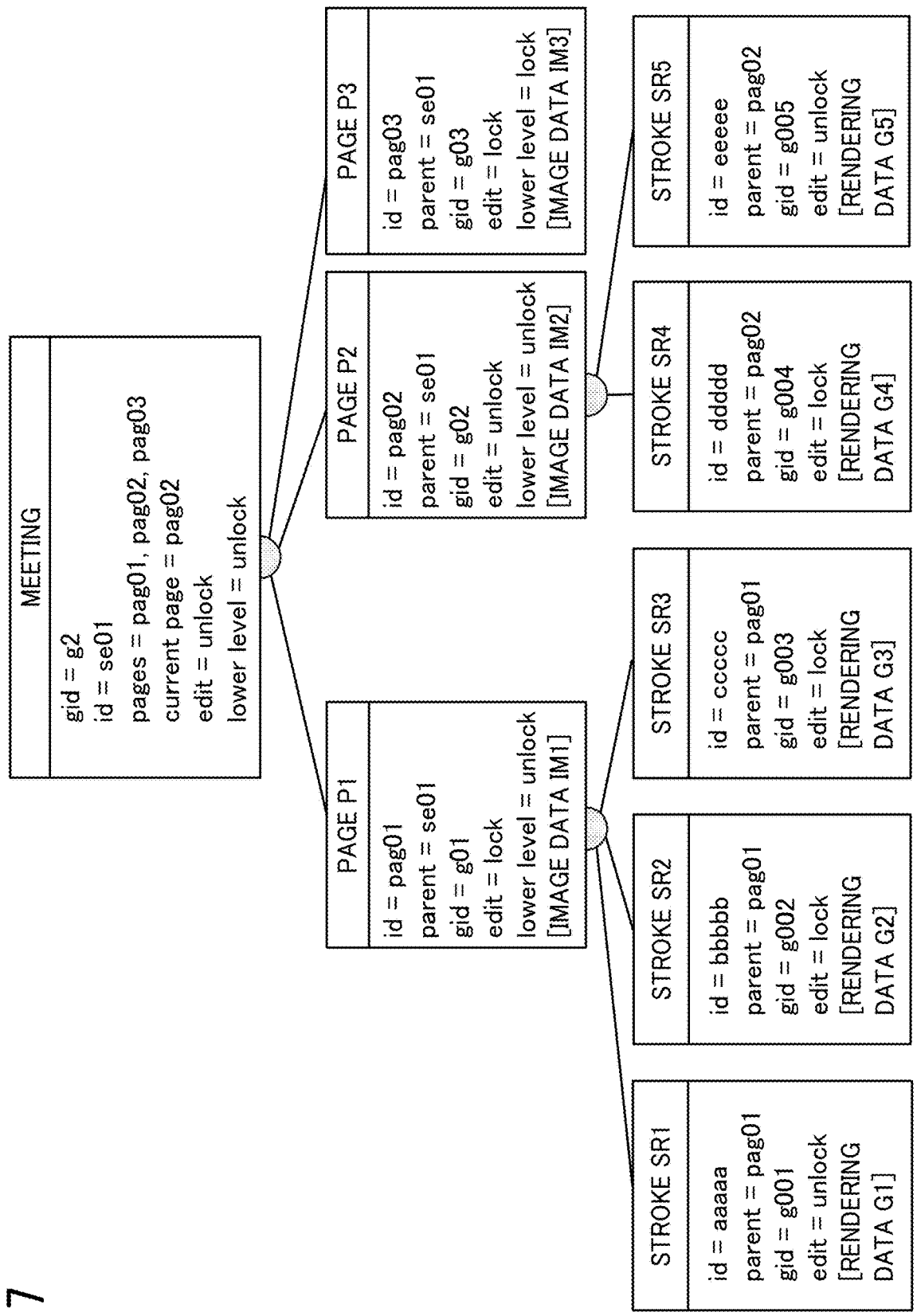
FIG. 7 is a diagram schematically illustrating an example of display screen information of the embodiment.

FIG. 7 is a diagram schematically illustrating an example of display screen information of the embodiment. FIG. 7 illustrates an example of the conceptual image of the information of the display screen for display on the electronic whiteboard 1, which is stored in the display screen management DB 1001.

In the example of FIG. 7, the display screen information has a hierarchical structure with layers of "meeting," "page" (i.e., pages P1, P2, and P3), and "stroke" (i.e., strokes SR1, SR2, SR3, SR4, and SR5). Herein, "stroke" corresponds to the stroke data of the embodiment, and is managed under the corresponding page. Each stroke is associated with the page including the stroke, with the layer of the page being defined as a higher layer of the stroke. Further, "page" represents the stored image data of a single-page screen (i.e., the display screen) displayed on the display 180. Each page is associated with the meeting in which the page is shared, with the layer of the meeting being defined as a higher layer of the page. Further, "meeting" represents the information of the meeting taking place on the electronic whiteboard 1. For example, the stroke SR1 includes a stroke ID identifying the stroke SR1 (id=aaaaa), information identifying the page P1 including the stroke SR1 (parent=pag01), a global ID (gid) of the corresponding rendering data G1 (gid=g001), editability information (edit) representing the editability of the stroke SR1, and the rendering data G1. To restrict or prohibit the editing of a stroke, the editability information (edit) of the stroke is set to "lock." To allow, i.e., not to restrict, the editing of a stroke, the editability information (edit) of the stroke is set to "unlock."

Further, if an operation such as a moving operation is performed on the stroke image represented by the stroke SR1, for example, the stroke ID (id=aaaaa) is maintained, but the rendering data G1 and the global ID identifying the rendering data G1 (gid=g001) are updated. The rendering data G1, which is rendering data for reproducing the stroke SR1, includes coordinate data, line width data, line color data, and vector data, for example.

The electronic whiteboard 1 is capable of switching between pages. Herein, "page" corresponds to each of the pages displayed on the electronic whiteboard 1. For example, the page P1 includes a page ID identifying the page P1 (id=pag01), information identifying the meeting taking place on the electronic whiteboard 1 (parent=se01), a global ID identifying the page data of the page P1 (gid=g01), editability information (edit) representing the editability of the page P1, lower-layer editability information (lower level) representing the editability of the strokes in a lower layer of the page P1, and image data IM1. The lower-layer editability information (lower level) indicates whether or not to allow the editing of the strokes in the lower layer, i.e. child data of the page data. To prohibit the editing of the data in the lower layer, the lower-layer editability information (lower level) is set to "lock." To allow the editing of the data in the lower layer, the lower-layer editability information (lower level) is set to "unlock."

The image data IM1 is the image data of the background image forming the page P1. That is, the image data IM1 represents the background image displayed on the page P1.

There may be a page not including the image data. In this case, the page not including the image data does not include the background image (i.e., includes a blank background).

Further, "meeting" corresponds to the meeting taking place on the electronic whiteboard 1, and is managed with a meeting ID identifying the meeting, a global ID identifying the meeting information of the meeting (gid=g2), information representing the pages generated in the meeting (pages), information representing the page forming the display screen currently displayed on the electronic whiteboard 1 (current page), editability information (edit) representing the editability of the meeting information, and lower-layer editability information (lower level) representing the editability of the data in a lower layer of the meeting. When the electronic whiteboard 1 is in remote communication with another electronic whiteboard 1, the meeting ID corresponds to a session ID identifying the session (id=se01).

For example, the image processing unit 16 of the electronic whiteboard 1 generates the stroke image rendered on the page P1 with rendering data items G1, G2, and G3 included in the strokes SR1, SR2, and SR3, respectively. The global IDs illustrated in the respective layers are assigned by the communication management apparatus 5 when the electronic whiteboard 1 shares data with another electronic whiteboard 1. The hierarchical structure of the shared data illustrated in FIG. 7 is shared by the plurality of electronic whiteboards 1.

Operation Information

Operation information representing an operation performed on the display screen of the electronic whiteboard 1 will be described with FIG. 8.

FIG. 8 is a diagram schematically illustrating an example of the operation information of the embodiment. The operation information illustrated in FIG. 8 includes the information of the operation performed on the display screen displayed on the electronic whiteboard 1. The operation information illustrated in FIG. 8 includes a stroke ID (Id) for identifying the corresponding stroke data, a page ID (DistId) for identifying the page on which the stroke data is rendered, operation type information (Operation Type) representing the type of the operation performed on the display screen, data type information (Data Type) representing the type of data as the operation target, and detailed data information (Data) representing the contents of the data as the operation target.

The operation type information represents the type of the operation performed by the user on a stroke or page included in the display screen. If the operation target is the stroke, for example, and if the stroke is rendered, the operation type information is described as "Add." If the stroke is removed, the operation type information is described as "Remove." If the stroke is moved, the operation type information is described as "Update." Further, when the operation target is the stroke, the data type information is described as "Stroke." When the operation target is the page, the data type information is described as "Page." Further, when the operation target is the stroke, the detailed data information corresponds to the stroke data, and includes information such as the coordinate data, the line width data, and the line color data. The detailed data information corresponds to information "body" included in a later-described shared data management table (see FIG. 14).

Functional Configuration of Relay Apparatus

Referring back to FIG. 6B, a description will be given of a functional configuration of the relay apparatus 3.

The relay apparatus 3 includes a communication unit 31 (i.e., a forwarding unit), a determination unit 35, and a storing and reading unit 39. Each of these units is a function or functional unit implemented when at least one of the components illustrated in FIG. 4 operates in response to a command from the CPU 301 in accordance with the relay program deployed on the RAM 303 from the HD 304. The relay apparatus 3 further includes a storage unit 3000 implemented by the RAM 303, the HD 304, or a recording medium 315 illustrated in FIG. 4.

The communication unit 31 is a function implemented by a command from the CPU 301 in FIG. 4 and the network I/F 309 in FIG. 4 to transmit and receive various data and information to and from another terminal, apparatus, or system via the communication network 100. The communication unit 31 also functions as a forwarding unit to forward the site image data and the audio data transmitted from a particular terminal to another terminal.

The determination unit 35 is a function implemented by a command from the CPU 301 in FIG. 4 to make various determinations such as a determination on a data delay state.

The storing and reading unit 39 is a function implemented by a command from the CPU 301 in FIG. 4 to store various data in the storage unit 3000 and read therefrom various data.

Functional Configuration of Communication Management Apparatus

A functional configuration of the communication management apparatus 5 will be described with FIG. 6A.

The communication management apparatus 5 includes a communication unit 51, an authentication unit 52, a determination unit 53, a terminal managing unit 54, a session managing unit 55, a relay apparatus managing unit 56, a shared data managing unit 57, a setting unit 58, and a storing and reading unit 59. Each of these units is a function or functional unit implemented when at least one of the components illustrated in FIG. 4 operates in response to a command from the CPU 501 in accordance with the communication management program deployed on the RAM 503 from the HD 504. The communication management apparatus 5 further includes a storage unit 5000 implemented by the RAM 503, the HD 504, or the recording medium 515 illustrated in FIG. 4. The storage unit 5000 stores an authentication management DB 5001, a terminal management DB 5002, a destination list management DB 5003, a session management DB 5004, a relay apparatus management DB 5005, a shared data management DB 5006, and a lower-layer setting condition management DB 5007.

The communication unit 51 is a function implemented by a command from the CPU 501 in FIG. 4 and the network I/F 509 in FIG. 4 to transmit and receive various data and information to and from another terminal or apparatus via the communication network 100. For example, the communication unit 51 receives stroke data transmitted to the electronic whiteboard 1 from another electronic whiteboard 1, and transmits stroke data to another electronic whiteboard 1.

The authentication unit 52 is a function implemented by a command from the CPU 501 in FIG. 4 to perform login authentication for a login requesting terminal. If the communication unit 51 receives login request information, the authentication unit 52 executes the login authentication process for the login requesting terminal with the authentication management DB 5001.

The determination unit 53 is a function implemented by a command from the CPU 501 in FIG. 4 to make various determinations.

The terminal managing unit 54 is a function implemented by a command from the CPU 501 in FIG. 4 to manage various information of each of the electronic whiteboards 1 managed in the terminal management DB 5002 in accordance with the state of the electronic whiteboard 1. The terminal managing unit 54 updates the information of the terminal management DB 5002 such as the operation state of the electronic whiteboard 1, the time of receipt of information from the electronic whiteboard 1, and the internet protocol (IP) address of the electronic whiteboard 1, for example. The terminal managing unit 54 further manages the destination list management DB 5003. In response to receipt of a request from one of the electronic whiteboards 1, the terminal managing unit 54 provides the electronic whiteboard 1 with destination list information including the terminal IDs of destination candidate terminals managed in the destination list management DB 5003.

The session managing unit 55 is a function implemented by a command from the CPU 501 in FIG. 4 to manage the session held in the communication system 10. For example, in response to receipt of start request information from one of the electronic whiteboards 1, the session managing unit 55 generates the session ID for identifying the session. The start request information represents the request to start communication. Further, for example, the session managing unit 55 stores and manages various information of the session in the session management DB 5004 in association with the session ID.

The relay apparatus managing unit 56 is a function implemented by a command from the CPU 501 in FIG. 4. In the present embodiment, the communication system 10 includes one or more relay apparatuses 3. When the communication system 10 includes a plurality of relay apparatuses 3, the relay apparatus managing unit 56 selects one of the plurality of relay apparatuses 3 to be used to relay the session. For example, the relay apparatus managing unit 56 manages the relay apparatus management DB 5005, and selects one of the plurality of relay apparatuses 3 based on various information of the relay apparatuses 3 stored in the relay apparatus management DB 5005. For example, based on the respective IP addresses of the relay apparatuses 3 stored in the relay apparatus management DB 5005 and the IP address of the starting terminal, the relay apparatus managing unit 56 selects one of the relay apparatuses 3 that is located near the starting terminal. Further, for example, the relay apparatus managing unit 56 selects one of the relay apparatuses 3 based on the respective maximum data transmission speeds of the relay apparatuses 3 stored in the relay apparatus management DB 5005. In the embodiment, a desired method may be employed to select the relay apparatus 3 for use in relaying the session.

The shared data managing unit 57 is a function implemented by a command from the CPU 501 in FIG. 4 to manage various data of the display screen transmitted and received between the electronic whiteboards 1 (i.e., communication terminals). For example, the shared data managing unit 57 receives various data transmitted via the management information session SEI from the electronic whiteboards 1 participating in the session, and stores and manages the data in the shared data management DB 5006 in association with the session ID.

The setting unit 58 is a function implemented by a command from the CPU 501 in FIG. 4 to set the editability (i.e., editing authority) of various data forming the display screen.

The storing and reading unit 59 is a function implemented by a command from the CPU 501 in FIG. 4 to store various data in the storage unit 5000 and read therefrom various data.

Authentication Management Table

FIG. 9 is a conceptual diagram illustrating an example of an authentication management table of the embodiment. The authentication management DB 5001 in the storage unit 5000 is configured as the authentication management table as illustrated in FIG. 9. In the authentication management table, the respective terminal IDs of all electronic whiteboards 1 managed by the communication management apparatus 5 are managed in association with respective passwords. For example, the authentication management table illustrated in FIG. 9 indicates that the electronic whiteboard 1a (i.e., a communication terminal) has a terminal ID "01aa" and a password "aaaa." The password is an example of authentication information. The authentication information also includes an access token.

Terminal Management Table

FIG. 10 is a conceptual diagram illustrating an example of a terminal management table of the embodiment. The terminal management DB 5002 in the storage unit 5000 is configured as the terminal management table as illustrated in FIG. 10. In the terminal management table, the destination name, the operation state, the reception time, and the terminal IP address are managed in association with each other for each terminal ID. The terminal ID identifies the corresponding electronic whiteboard 1 (i.e., a communication terminal). The destination name represents the name of the electronic whiteboard 1 as the destination. The operation state represents the operation state of the electronic whiteboard 1. The reception time represents the date and time of receipt of the login request information by the communication management apparatus 5. The terminal IP address represents the IP address of the electronic whiteboard 1 (i.e., a communication terminal). For example, the terminal management table in FIG. 10 indicates that the electronic whiteboard 1a with the terminal ID "01aa" has a destination name "TERMINAL AA, TOKYO BRANCH, JAPAN," an operation state "ON-LINE (COMMUNICATION AVAILABLE)," a reception time of "13:40 on Feb. 10, 2020" as the date and time of receipt of the login request information by the communication management apparatus 5, and a terminal IP address "1.2.1.3" corresponding to the terminal ID "01aa." The terminal ID, the destination name, and the terminal IP address are stored in the terminal management table when the electronic whiteboard 1 is previously registered to receive a service provided by the communication management apparatus 5.

Destination List Management Table

FIG. 11 is a conceptual diagram illustrating an example of a destination list management table of the embodiment. The destination list management DB 5003 in the storage unit 5000 is configured as the destination list management table as illustrated in FIG. 11. In the destination list management table, the respective terminal IDs of all destination candidate terminals are managed in association with the terminal ID of the starting terminal. The starting terminal is the electronic whiteboard 1 that transmits a communication start request. The destination candidate terminals are the electronic whiteboards 1 registered as the candidates for the destination terminal corresponding to the starting terminal. For example, the destination list management table illustrated in FIG. 11 indicates that the destination candidate terminals to which the electronic whiteboard 1a with the terminal ID "01aa" (i.e., the starting terminal) is able to transmit the communication start request are electronic whiteboards 1 including the electronic whiteboard 1b with a terminal ID "01ba." The destination candidate terminals in the destination list management table are updated when a destination candidate terminal is added to or deleted from the destination list management table in response to receipt of an addition request or a deletion request from a given starting terminal to the communication management apparatus 5.

The destination list is an example of destination information. In the destination information, the information of the destination candidate terminals such as the terminal IDs thereof may be arranged in a format other than the list format.

Session Management Table

FIG. 12 is a conceptual diagram illustrating an example of a session management table of the embodiment. The session management DB 5004 in the storage unit 5000 is configured as the session management table as illustrated in FIG. 12. In the session management table, the relay apparatus ID, the starting terminal ID, the destination terminal ID, the delay time, and the delay information reception time are managed in association with each other for each session ID. The session ID identifies the session for implementing the communication between the relay apparatus 3 and the electronic white boards 1 (i.e., communication terminals). The relay apparatus ID is the apparatus ID of the relay apparatus 3 used in the session. The starting terminal ID is the terminal ID of the electronic whiteboard 1 serving as the starting terminal. The destination terminal ID is the terminal ID of the electronic white board 1 serving as the destination terminal. The delay time represents the delay time (milliseconds: ms) in the reception of the site image data by the destination terminal. The delay information reception time represents the date and time of receipt of delay information by the communication management apparatus 5. The delay information, which represents the delay time, is transmitted from the destination terminal. For example, the session management table illustrated in FIG. 12 indicates that the relay apparatus 3 with a relay apparatus ID "111a" relays the site image data and the audio data between an electronic white board 1 with a terminal ID "01aa" and an electronic white board 1 with a terminal ID "01 db" in a communication session executed with a session ID "se01." The session management table further indicates that the delay time of the site image data in the electronic white board 1 serving as the destination terminal is 200 ms at "13:41 on Feb. 10, 2020."

Relay Apparatus Management Table

FIG. 13 is a conceptual diagram illustrating an example of a relay apparatus management table of the embodiment. The relay apparatus management DB 5005 in the storage unit 5000 is configured as the relay apparatus management table as illustrated in FIG. 13. In the relay apparatus management table, the operation state of each relay apparatus 3, the date and time of receipt of state information of the relay apparatus 3 by the communication management apparatus 5, the IP address of the relay apparatus 3, and the maximum data transmission speed (megabits per second: Mbps) of the relay apparatus 3 are managed in association with each other for each relay apparatus ID. The relay apparatus ID represents the relay apparatus ID of the relay apparatus 3. The state information includes the information of the operation state of the relay apparatus 3. For example, the relay apparatus management table illustrated in FIG. 13 indicates that the operation state of the relay apparatus 3 with a relay apparatus ID "111a" is "ON-LINE," and that the date and time of receipt of the state information by the communication management apparatus 5 is "13:00 on Feb. 10, 2020." The relay apparatus management table further indicates that the relay apparatus 3 has an IP address "1.2.1.2" and a maximum data transmission speed of 100 Mbps.

Shared Data Management Table

FIG. 14 is a conceptual diagram illustrating an example of a shared data management table of the embodiment. The shared data management DB 5006 in the storage unit 5000 is configured as the shared data management table as illustrated in FIG. 14. In the shared data management table, various data of the display screen shared and stored by the electronic whiteboards 1 (i.e., communication terminals) is stored and managed for each session ID for identifying the session for implementing the communication between the electronic whiteboards 1 and the relay apparatus 3. The data of the shared data management table corresponds to the display screen information (see FIG. 7) stored in the display screen management DB 1001 in each of the electronic whiteboards 1.

The data of the shared data management table includes an ID for identifying each data item, a sequence number representing the generation order of the data item, information "body" representing the contents of the data item, information "parent" for identifying higher-layer (i.e., parent) data of the data item, editability information (edit) representing the editability of the data item, and lower-layer editability information (lower level) representing the editability of the data in a lower layer associated with the data item. For example, in the case of meeting information representing a remote conference being held between a plurality of electronic whiteboards 1, the shared data management table includes a meeting ID (i.e., session ID) for identifying the remote conference being held, information "children" representing the pages generated in the remote conference, information "current page" representing the page forming the display screen currently displayed on the electronic whiteboards 1, editability information (edit) representing the editability of the meeting information, and lower-layer editability information (lower level) representing the editability of the data in a lower layer associated with the meeting information. Further, in the case of page data, for example, the shared data management table includes a page ID for identifying the page corresponding to the page data, a uniform resource locator (URL) representing the storage location of the background image data forming the page, editability information (edit) representing the editability of the page, and lower-layer editability information (lower level) representing the editability of the strokes in a lower layer associated with the page.

Further, in the case of stroke data, for example, the shared data management table includes a stroke ID for identifying the stroke data generated by a stroke rendering event, information "body" representing the contents of the stroke data, information "parent" for identifying the page (i.e., page data) including the stroke, and editability information (edit) representing the editability of the stroke. In this case, the information "body" representing the contents of the stroke data includes information such as the color of the rendered stroke, the width representing the thickness of the line of the rendered stroke, and the coordinates (x, y) of the vertices of the rendered stroke.

Herein, the stroke rendering refers to a process of inputting rendering information performed by the user. For example, the stroke rendering is an event in which the user presses the electronic pen 190 against the display 180, moves the electronic pen 190 while in contact with the display 180, and releases the electronic pen 190 from the display 180. The color of the stroke is expressed by numerical values each ranging from 0 to 25 to represent the corresponding color component in the red-green-blue-alpha (RGBA) data format. The width representing the thickness of the line of the rendered stroke is represented by the number of pixels. Each of the vertices of the rendered stroke is represented by X and Y coordinates. The vertices are connected together by a Bezier curve to form a line segment representing the stroke. With the shared data management table, the communication management apparatus manages the various data of the display screen including the stroke data generated in a video conference using a particular communication session, for example.

Lower-Layer Setting Condition Management Table

FIG. 15 is a conceptual diagram illustrating an example of a lower-layer setting condition management table of the embodiment. The lower-layer setting condition management DB 5007 in the storage unit 5000 is configured as the lower-layer setting condition management table as illustrated in FIG. 15. The lower-layer setting condition management table stores setting information for setting the lower-layer editability information. The lower-layer setting condition management table stores setting conditions in which each operation item representing an operation performed on the various data forming the display screen is associated with setting information for setting the editability of the data in a lower layer associated with the data of the operation target. For example, in the lower-layer setting condition management table illustrated in FIG. 15, the setting information corresponding to an operation item "removing the page" is "lock," the setting information corresponding to an operation item "switching pages" is "unlock," and the setting information corresponding to an operation item "moving the object group" is "lock." Based on the setting information, the setting unit 58 sets the lower-layer editability information of the operation item corresponding to the operation request received by the communication unit 51.

Functional Configuration of Image Storing Apparatus

Referring back to FIG. 6B, a description will be given of a functional configuration of the image storing apparatus 7.

The image storing apparatus 7 includes a communication unit 71, a generation unit 73, and a storing and reading unit 79. Each of these units is a function or functional unit implemented when at least one of the components illustrated in FIG. 4 operates in response to a command from the CPU 701 in accordance with the image storage program deployed on the RAM 703 from the HD 704. The image storing apparatus 7 further includes a storage unit 7000 implemented by the RAM 703, the HD 704, or a recording medium 715 illustrated in FIG. 4.

The communication unit 71 is a function implemented by a command from the CPU 701 in FIG. 4 and the network I/F 709 in FIG. 4 to transmit and receive various data and information to and from another terminal or apparatus via the communication network 100.

The generation unit 73 is a function implemented by a command from the CPU 701 in FIG. 4 to generate the URL representing the storage location of the background image data.

The storing and reading unit 79 is a function implemented by a command from the CPU 701 in FIG. 4 to store various data in the storage unit 7000 and read therefrom various data.

Processes and Operations of Embodiment

Processes and operations performed in the communication system 10 of the embodiment will be described with FIGS. 16 to 28.

Preparatory Process for Remote Communication

A preparatory process for remote communication performed by the electronic whiteboard 1a as the login requesting terminal will first be described with FIGS. 16 and 17. The electronic whiteboard 1b performs a login request process similar to that performed by the electronic whiteboard 1a, and thus description thereof will be omitted.

Figure 16:
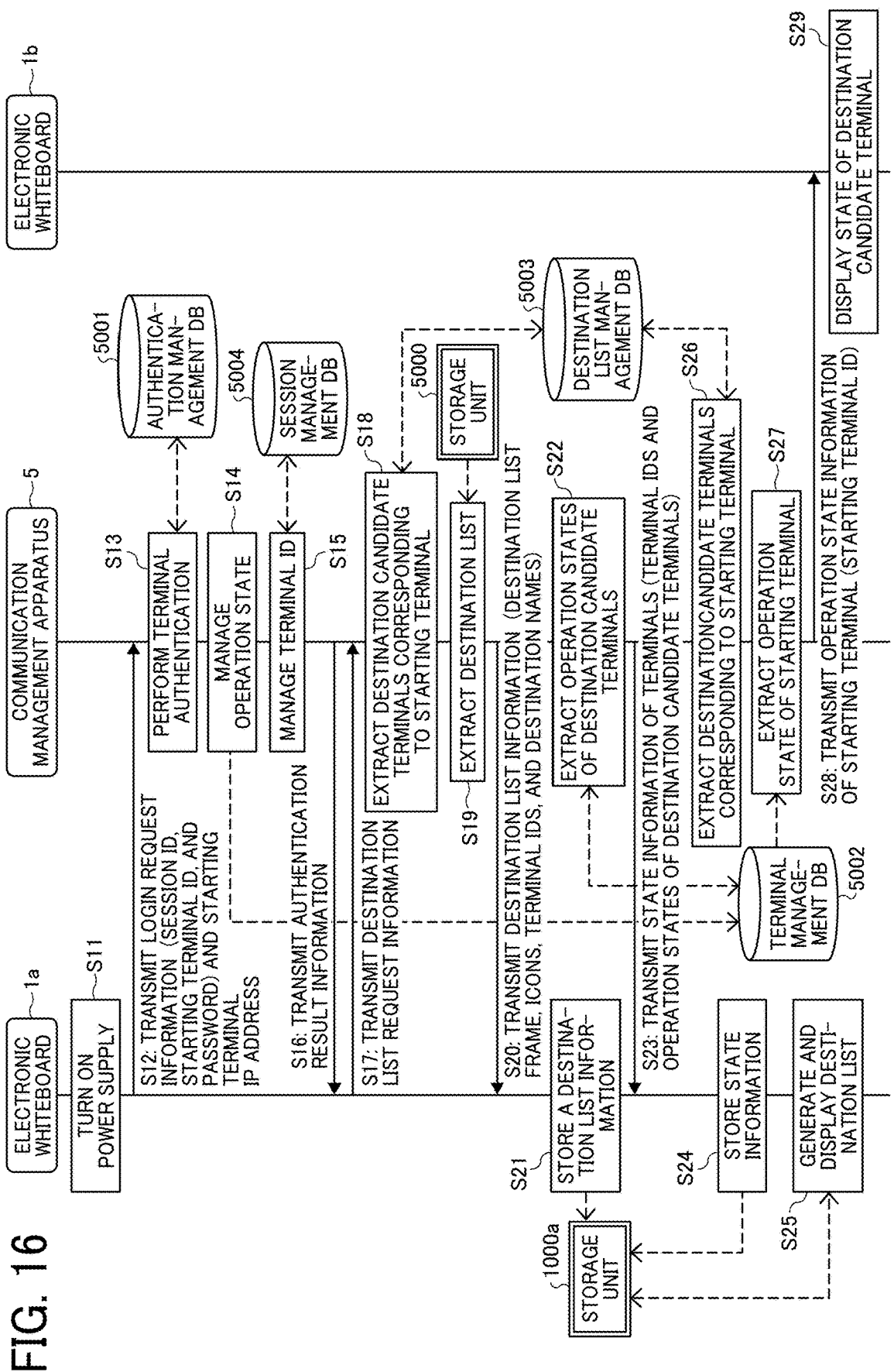
FIG. 16 is a sequence diagram illustrating an example of a preparatory process to start remote communication between electronic whiteboards of the embodiment.

FIG. 16 is a sequence diagram illustrating an example of a preparatory process to start remote communication between the electronic whiteboards 1. FIG. 17 is a diagram illustrating an example of a destination list screen displayed on one of the electronic whiteboards 1.

When the power switch 122 of the electronic whiteboard 1a is turned on, the receiving unit 12a receives the power-on operation (step S11).

The communication unit 11a then transmits the login request information to the communication management apparatus 5 via the communication network 100 (step S12). The login request information, which represents the request for login authentication, includes the terminal ID of the electronic whiteboard 1a and the password. The terminal ID and the password are data read from the storage unit 1000a and transmitted to the communication unit 11a by the storing and reading unit 19a. The terminal ID and the password transmitted to the communication unit 11a are not necessarily read from the storage unit 1000a, and may be input by the user with an input device such as a keyboard, or may be read from a recording medium connected to the electronic whiteboard 1a, such as a subscriber identify module (SIM) card or an SD card. Then, the communication unit 51 of the communication management apparatus 5 receives the login request information transmitted from the electronic whiteboard 1a.

Then, the authentication unit 52 of the communication management apparatus 5 performs a search through the authentication management table (see FIG. 9) with search keys set to the terminal ID and the password included in the login request information received via the communication unit 51. If the same terminal ID and password as those included in the login request information are managed in the authentication management table, the authentication unit 52 allows login of the electronic whiteboard 1a (step S13), and the processes of step S14 and the subsequent steps are executed.

If the login of the electronic whiteboard 1a is allowed, the terminal managing unit 54 updates the information of the terminal management table (see FIG. 10), specifically the information corresponding to the terminal ID "01aa" of the electronic whiteboard 1a. For example, the terminal managing unit 54 changes the information of the operation state corresponding to the terminal ID "01aa" to "ON-LINE (COMMUNICATION AVAILABLE)," and updates the information of the reception time to the date and time of receipt of the login request information (step S14). The information of the terminal IP address in the terminal management table may be transmitted from the electronic whiteboard 1a at step S12 instead of being previously registered in the terminal management table. Thereby, the operation state "ON-LINE (COMMUNICATION AVAILABLE)," the reception time "2020.2.10.13:40 (13:40 on Feb. 10, 2020)," and the terminal IP address "1.2.1.3" are managed in the terminal management table in association with the terminal ID "01aa," as illustrated in FIG. 10, for example.

Then, the session managing unit 55 adds a new record to the session management table (see FIG. 12) and manages the new record (step S15). In the new record, the terminal ID "01aa" of the electronic whiteboard 1a received at step S12 is managed as the starting terminal ID. Then, the communication unit 51 transmits authentication result information to the electronic whiteboard 1a (i.e., the source of the login request information) via the communication network 100 (step S16). The authentication result information represents an authentication result obtained through the process of step S13.

In response to receipt of the authentication result information indicating that the login of the electronic whiteboard 1a is allowed, the communication unit 11a of the electronic whiteboard 1a (i.e., the login requesting terminal) transmits destination list request information to the communication management apparatus 5 via the communication network 100 (step S17). The destination list request information represents the request for the destination list. Then, the communication unit 51 of the communication management apparatus 5 receives the destination list request information.

Then, the terminal managing unit 54 performs a search through the destination list management table (see FIG. 11) with a search key set to the terminal ID "01aa" of the electronic whiteboard 1a (i.e., the login requesting terminal), to thereby read from the destination list management table the terminal IDs of the destination candidate terminals that are capable of communicating with the electronic whiteboard 1a. The terminal managing unit 54 further reads, from the terminal management table (see FIG. 10), the destination names corresponding to the terminal IDs of the destination candidate terminals (step S18). In the present example, the terminal managing unit 54 extracts the terminal IDs of the destination candidate terminals corresponding to the terminal ID "01 aa" of the electronic whiteboard 1a and the destination names corresponding to the terminal IDs.

Then, the communication unit 51 reads data from the storage unit 5000, for example, via the storing and reading unit 59 (step S19). The data read in this step includes the data of a destination list frame and the data of icons representing operation states. The communication unit 51 further transmits the destination list information to the electronic whiteboard 1a (step S20). The destination list information includes the read destination list frame and icons and the terminal IDs and the destination names extracted at step S18. That is, the destination list information includes the destination list frame, the icons, the terminal IDs, and the destination names. Then, in the electronic whiteboard 1a, the communication unit 11a receives the destination list information, and the storing and reading unit 19a stores the received destination list information in the storage unit 1000a (step S21).

In the embodiment, the communication management apparatus 5 thus centrally manages the destination list information of all electronic whiteboards 1, instead of each of the electronic whiteboards 1 managing the destination list information. In the communication system 10 of the embodiment, therefore, the communication management apparatus 5 centrally responds to changes such as the addition of a new electronic whiteboard 1 to the communication system 10, the replacement of any of the electronic whiteboards 1 in the communication system 10 with a new electronic whiteboard 1, and a change in the appearance of the destination list frame. Consequently, the electronic whiteboards 1 are saved from a process of changing the destination list information.

The terminal managing unit 54 further performs a search through the terminal management table (see FIG. 10) with search keys set to the terminal IDs of the destination candidate terminals extracted at step S18, to thereby read from the terminal management table the respective operation states corresponding to the terminal IDs of the destination candidate terminals. Thereby, the terminal managing unit 54 acquires the respective operation states of the electronic whiteboards 1 corresponding to the terminal IDs of the destination candidate terminals (step S22).

The communication unit 51 then transmits terminal state information to the electronic whiteboard 1a via the communication network 100 (step S23). The terminal state information includes the terminal IDs used as the search keys at step S22 and the respective operation states of the destination candidate terminals corresponding to the terminal IDs.

Then, the storing and reading unit 19a of the electronic whiteboard 1a sequentially stores, in the storage unit 1000a, the items of the terminal state information received from the communication management apparatus 5 (step S24). The electronic whiteboard 1a thereby receives the terminal state information of the electronic whiteboards 1 as the destination candidate terminals, and thus acquires the current operation states of the destination candidate terminals, i.e., the other electronic whiteboards 1 such as the electronic whiteboard 1b that are capable of communicating with the electronic whiteboard 1a.

Then, based on the destination list information and the terminal state information stored in the storage unit 1000a, the display control unit 14a generates the destination list reflecting the states of the destination candidate terminals. Further, with the generated destination list, the display control unit 14a controls the display 180 of the electronic whiteboard 1a to display a destination list screen 800 as illustrated in FIG. 17 (step S25). The destination list screen 800 displays, for each of the destination candidate terminals, the icon representing the operation state of the destination candidate terminal and the terminal ID and the destination name of the destination candidate terminal. In the example of FIG. 17, the icon representing the operation state of the destination candidate terminal is displayed as an "OFF-LINE" icon in the first row of the destination list screen 800 and as an "ON-LINE (COMMUNICATION AVAILABLE)" icon in the second row and a lower row of the destination list screen 800.

In the communication management apparatus 5, the terminal managing unit 54 performs a search through the destination list management table (see FIG. 11) based on the terminal ID "01aa" of the electronic whiteboard 1a, to thereby extract from the destination list management table the terminal IDs of the other electronic whiteboards 1 in which the electronic whiteboard 1a is registered as a destination candidate terminal (step S26). In the destination list management table in FIG. 11, terminal IDs "01ba," "01ca," and "01da" are among the terminal IDs of the other electronic whiteboards 1 read in this step.

The terminal managing unit 54 then performs a search through the terminal management table (see FIG. 10) based on the terminal ID "01aa" of the electronic whiteboard 1a, to thereby acquire the operation state of the electronic whiteboard 1a from the terminal management table (step S27).

Then, the communication unit 51 transmits terminal state information to the electronic whiteboards 1 corresponding to the terminal IDs extracted at step S26 and corresponding to the operation state "ON-LINE" in the terminal management table (see FIG. 10) (step S28). The terminal state information in this case includes the terminal ID "01aa" of the electronic whiteboard 1a and the operation state "ON-LINE" of the electronic whiteboard 1a acquired at step S27. When transmitting the terminal state information to the other electronic whiteboards 1 such as the electronic whiteboard 1b, the communication unit 51 refers to the IP addresses of the electronic whiteboards 1 managed in the terminal management table (see FIG. 10) based on the terminal IDs of the electronic whiteboards 1. Thereby, the communication unit 51 transmits the terminal ID "01aa" and the operation state "ON-LINE" of the electronic whiteboard 1a to each of the other electronic whiteboards 1 capable of communicating with the electronic whiteboard 1a, which is a destination candidate terminal for the other electronic whiteboards 1. Consequently, each of the destination candidate terminals (i.e., the other electronic whiteboards 1 such as the electronic whiteboard 1b) also displays, on the display 180 thereof, the state of the electronic whiteboard 1a (i.e., a destination candidate terminal for the other electronic whiteboards 1 such as the electronic whiteboard 1b) (step S29).

Process of Starting Remote Communication

Figure 18:
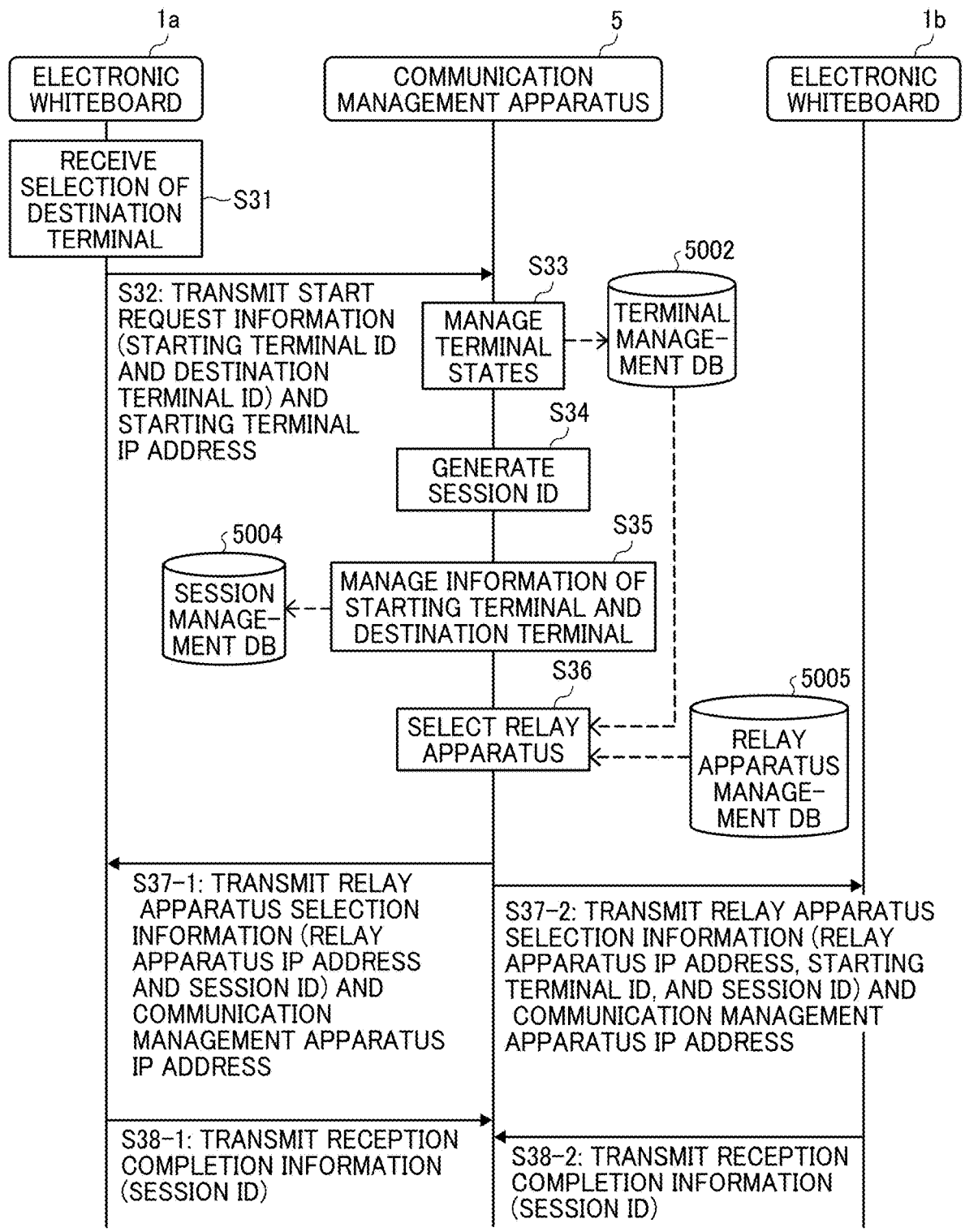
FIG. 18 is a sequence diagram illustrating an example of a remote communication start process of the embodiment.

With reference to FIG. 18, a description will be given of a process in which the electronic whiteboard 1a starts remote communication with the electronic whiteboard 1b.

FIG. 18 is a sequence diagram illustrating an example of a process of starting remote communication. When the user UA1 of the electronic whiteboard 1a (i.e., the starting terminal) selects the electronic whiteboard 1b (i.e., the destination terminal) by pressing a field in the destination list screen 800 of FIG. 17 corresponding to the terminal ID "01ba" of the electronic whiteboard 1b as a destination candidate terminal, the receiving unit 12a receives the user request to start the communication with the electronic whiteboard 1b (step S31). Then, the communication unit 11a of the electronic whiteboard 1a (i.e., the starting terminal) transmits the start request information to the communication management apparatus (step S32). The start request information, which represents the request to start the communication, includes the terminal ID "01aa" of the electronic whiteboard 1a (i.e., the starting terminal) and the terminal ID "01ba" of the electronic whiteboard 1b (i.e., the destination terminal). Then, the communication unit 51 of the communication management apparatus 5 receives the start request information and the IP address of the electronic whiteboard 1a (i.e., the starting terminal) as the source of the start request information.

Then, the terminal managing unit 54 updates the terminal management table (see FIG. 10) based on the terminal ID "01aa" of the electronic whiteboard 1a (i.e., the starting terminal) and the terminal ID "01ba" of the electronic whiteboard 1b (i.e., the destination terminal) included in the start request information (step S33). For example, based on the terminal ID "01aa" of the electronic whiteboard 1a (i.e., the starting terminal) and the terminal ID "01ba" of the electronic whiteboard 1b (i.e., the destination terminal) included in the start request information, the terminal managing unit 54 updates the respective operation states corresponding to the terminal IDs "01aa" and "01ba" in the terminal management table to "ON-LINE (COMMUNICATING)." The information of the electronic whiteboard 1a (i.e., the starting terminal) and the electronic whiteboard 1b (i.e., the destination terminal) managed in the terminal management table in this state indicates that the electronic whiteboards 1a and 1b have not participated in a session yet but are in a communicating state. That is, the electronic whiteboard 1a (i.e., the starting terminal) and the electronic whiteboard 1b (i.e., the destination terminal) have not started a video conference yet, but are in the communicating state. Therefore, if a user of another electronic whiteboard 1 (e.g., a user of another electronic whiteboard 1 intending to join the communication) attempts to communicate with the electronic whiteboard 1a (i.e., the starting terminal) or the electronic whiteboard 1b (i.e., the destination terminal) in this state, the another electronic whiteboard 1 outputs a notification sound or displays a message to notify the user that the electronic whiteboard 1a or 1b is in the communicating state.

A description will be given of a process of executing a session to select the relay apparatus 3 to be used.

The session managing unit 55 of the communication management apparatus 5 first generates the session ID for identifying the session to be held between the electronic whiteboards 1a and 1b (step S34). It is assumed here that the session ID "se01" is generated.

The session managing unit 55 then stores and manages the session ID "se01" generated at step S34, the terminal ID "01aa" of the electronic whiteboard 1a (i.e., the starting terminal), and the terminal ID "01ba" of the electronic whiteboard 1b (i.e., the destination terminal) in the session management table (see FIG. 12) in association with each other (step S35).

Then, the relay apparatus managing unit 56 selects the relay apparatus 3 that relays the session between the electronic whiteboard 1a (i.e., the starting terminal) and the electronic whiteboard 1b (i.e., the destination terminal) (step S36). For example, the relay apparatus managing unit 56 selects, from the relay apparatuses 3 with relay apparatus IDs corresponding to the operation state "ON-LINE" in the relay apparatus management table (see FIG. 13), the relay apparatus 3 having an IP address close to the IP address of the electronic whiteboard 1a (i.e., the starting terminal) in the terminal management table (see FIG. 10). It is assumed in the following description that the relay apparatus 3 with the relay apparatus ID "111a" has been selected.

After the completion of the process of step S36 to select the relay apparatus 3, the communication unit 51 of the communication management apparatus 5 transmits relay apparatus selection information to the electronic whiteboard 1a (i.e., the starting terminal) (step S37-1). The relay apparatus selection information includes the IP address of the relay apparatus 3 selected at step S36 and the session ID "se01" generated at step S34. Then, the electronic whiteboard 1a (i.e., the starting terminal) acquires the IP address of the communication management apparatus 5 as the source of the relay apparatus selection information.

The communication unit 51 of the communication management apparatus 5 further transmits relay apparatus selection information to the electronic whiteboard 1b (i.e., the destination terminal) (step S37-2). The relay apparatus selection information includes the IP address of the relay apparatus 3 selected at step S36, the terminal ID "01 aa" of the electronic whiteboard 1a (i.e., the starting terminal), and the session ID "se01" generated at step S34. In the execution of the session with the session ID "se01," therefore, the electronic whiteboard 1b (i.e., the destination terminal) acquires the IP address of the communication management apparatus 5 as the source of the relay apparatus selection information.

Then, the communication unit 11a of the electronic whiteboard 1a (i.e., the starting terminal) transmits reception completion information to the communication management apparatus 5 (step S38-1). The reception completion information indicates that the relay apparatus selection information transmitted in the process of step S37-1 has been received. The reception completion information includes the session ID transmitted in the process of step S37-1. Then, the communication management apparatus 5 acquires a message that the transmission of the relay apparatus selection information executed in a particular session with the session ID "se01" has been completed.

The electronic whiteboard 1*b* (i.e., the destination terminal) similarly transmits, to the communication management apparatus 5, reception completion information indicating that the relay apparatus selection information transmitted in the process of step S37-2 has been received (step S38-2). In this case, too, the communication management apparatus 5 acquires the message that the transmission of the relay apparatus selection information executed in the particular session with the session ID "se01" has been completed.

As described above, the electronic whiteboards 1*a* and 1*b* transmit and receive the site image data and the audio data to and from each other via the relay apparatus 3 selected at step S36, to thereby have the video conference.

Process of Sharing Data between Electronic Whiteboards

A process of sharing data between the electronic whiteboards 1 will be described with FIGS. 19 to 23C.

Figure 19:
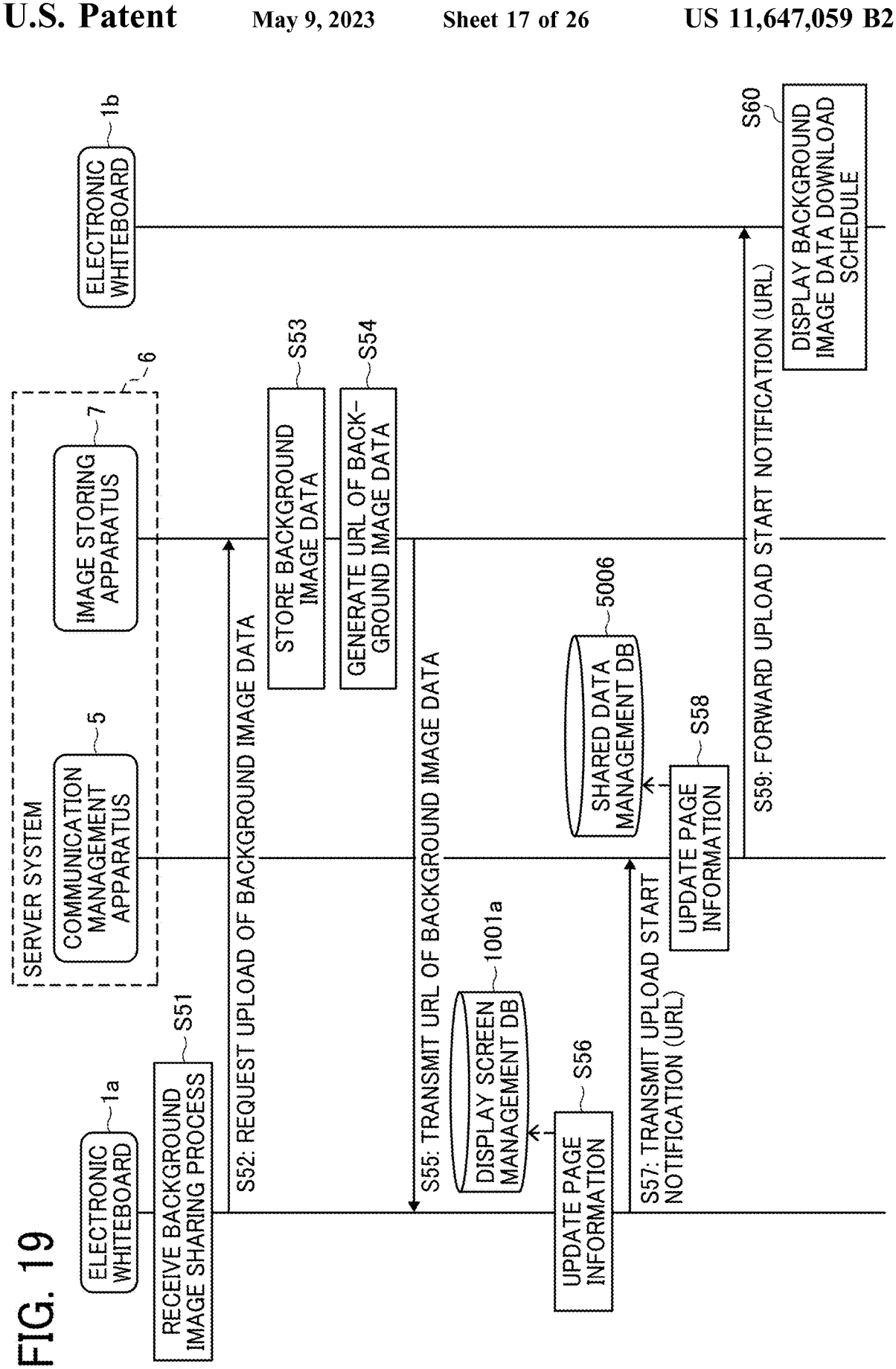
Figure 20:
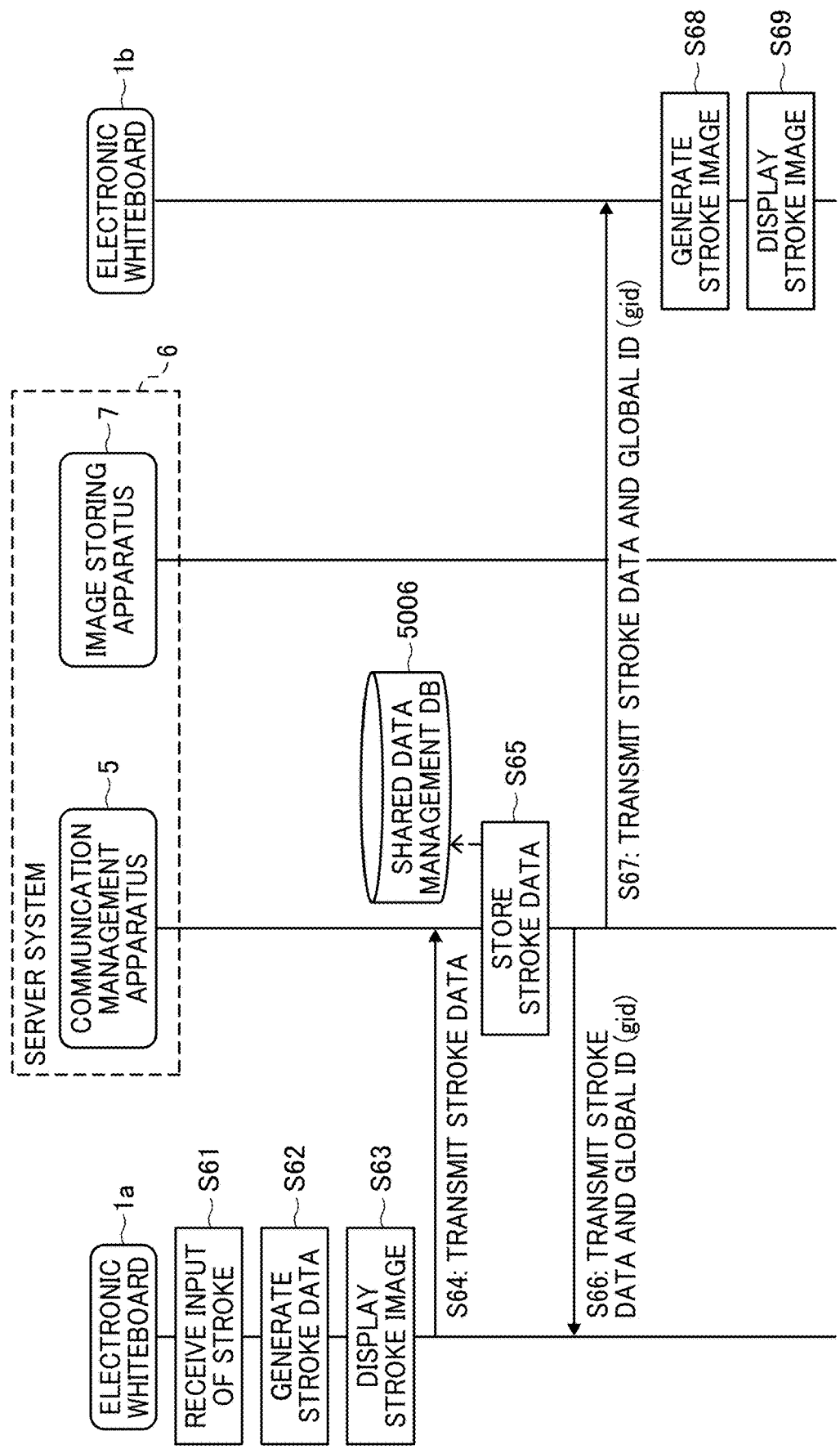

FIGS. 19 to 21 are sequence diagrams illustrating an example of the process of sharing data between the electronic whiteboards 1 in the communication system 10 of the embodiment.

The following description will be given of an example in which the electronic whiteboards 1*a* and 1*b* share the background image data and the stroke data such that the background image displayed on the electronic whiteboard 1*a* and the stroke image input to the electronic whiteboard 1*a* are also displayed on the electronic whiteboard 1*b*.

Figure 22A:
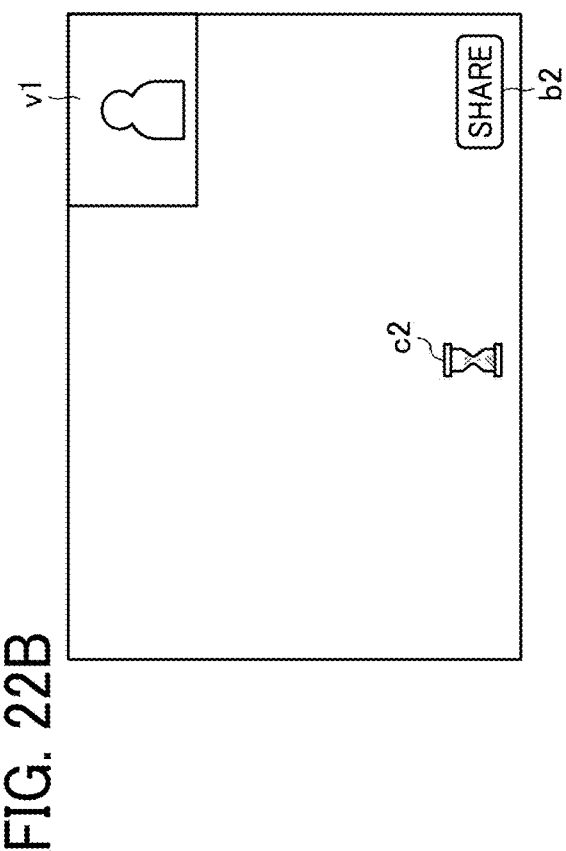
FIG. 22A is a diagram illustrating an example of a screen displayed on one of the electronic whiteboards of the embodiment.
Figure 22B:
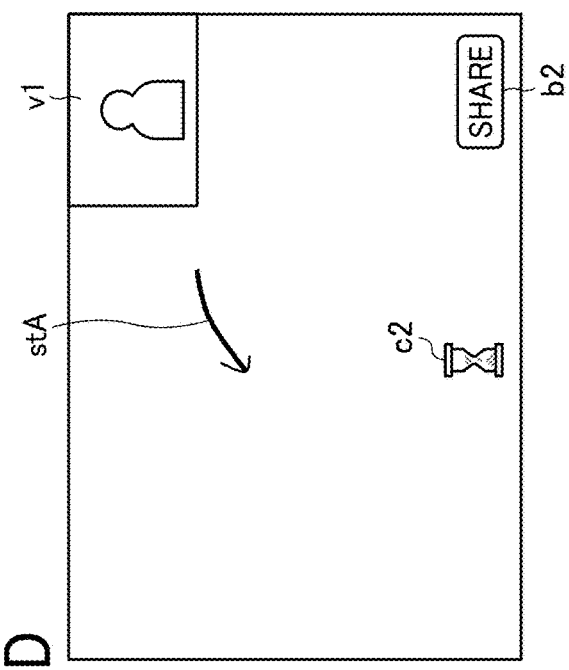
FIG. 22B is a diagram illustrating an example of a screen displayed on the other electronic whiteboard of the embodiment.
Figure 22C:
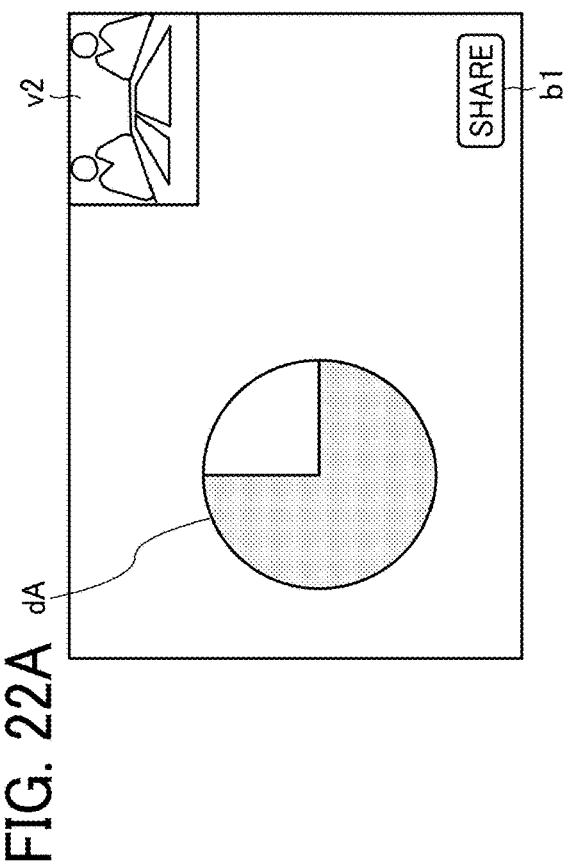
FIG. 22C is a diagram illustrating another example of the screen displayed on the one of the electronic whiteboards of the embodiment.
Figure 22D:
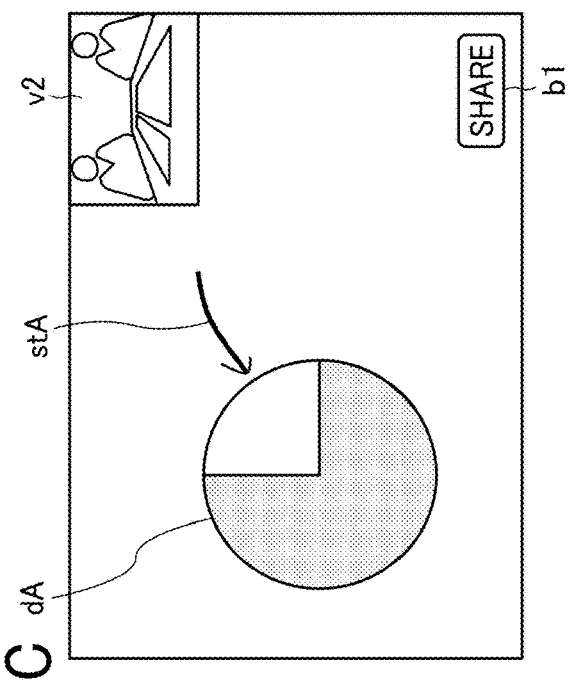
FIG. 22D is a diagram illustrating another example of the screen displayed on the other electronic whiteboard of the embodiment.

FIG. 22A illustrates an example of a screen displayed on the electronic whiteboard 1*a*. FIG. 22B illustrates an example of a screen displayed on the electronic whiteboard 1*b*. FIG. 22C illustrates another example of the screen displayed on the electronic whiteboard 1*a*. FIG. 22D illustrates another example of the screen displayed on the electronic whiteboard 1*b*.

In the electronic whiteboard 1*a* at the site A, the display control unit 14*a* controls the display 180 to display the screen illustrated in FIG. 22A. The screen of FIG. 22A displays a background image dA, an image v2 of the site B, and a share button b1 that is pressed to share the background image dA. When the user UA1 of the electronic whiteboard 1*a* presses the share button b1 in this state, the receiving unit 12*a* receives a background image sharing process requested by the user UA1 (step S51). Then, the communication unit 11*a* transmits an upload request to the image storing apparatus 7 to request upload of the image data of the background image dA (hereinafter referred to as the background image data) (step S52). In this case, the communication unit 11*a* transmits the background image data to a predetermined URL for uploading data (e.g., http://qwejp/upload), for example. Then, the communication unit 71 of the image storing apparatus 7 receives the upload request transmitted from the electronic whiteboard 1*a*.

The storing and reading unit 79 of the image storing apparatus 7 stores the background image data received at step S52 in the storage unit 7000 (step S53). Then, the generation unit 73 of the image storing apparatus 7 generates the URL representing the storage location of the stored background image data (step S54). The URL is an example of storage location information. The storage location information also includes a uniform resource identifier (URI). The execution order of steps S53 and S54 may be reversed. Further, steps S53 and S54 may be executed in parallel. Thereby, the electronic whiteboard 1*a* is able to start uploading the background image data.

The communication unit 71 of the image storing apparatus 7 then transmits, to the electronic whiteboard 1*a*, the URL of the background image data generated by the generation unit 73 (step S55). Then, the communication unit 11*a* of the electronic whiteboard 1*a* receives the URL of the background image data transmitted from the image storing apparatus 7.

Then, the display screen managing unit 21*a* of the electronic whiteboard 1*a* updates the page information stored in the display screen management DB 1001*a* (step S56). In this case, the display screen managing unit 21*a* stores the page data corresponding to the background image data to be uploaded to the image storing apparatus 7 (e.g., the page data of the Page P1).

Then, the communication unit 11*a* transmits an upload start notification to the communication management apparatus 5 to notify that the upload of the background image data has started (step S57). The upload start notification includes the page ID of the page corresponding to the background image data to be uploaded and the URL received at step S55. Then, the communication unit 51 of the communication management apparatus 5 receives the upload start notification transmitted from the electronic whiteboard 1*a*.

Based on the various information received at step S57, the shared data managing unit 57 of the communication management apparatus 5 updates the page information stored in the shared data management DB 5006 (see FIG. 14) (step S58). Specifically, the shared data managing unit 57 searches through the shared data management table for the information "body" associated with the page ID received at step S57, and describes the URL received at step S57 in the information "body." The shared data managing unit 57 further assigns a global ID (gid) to the page (i.e., page data) to be stored in the shared data management DB 5006.

The communication unit 51 of the communication management apparatus 5 forwards the upload start notification received at step S57 to the electronic whiteboard 1*b*, which is having the remote conference with the electronic whiteboard 1*a* (step S59). The communication unit 11*b* of the electronic whiteboard 1*b* then receives the upload start notification. Then, the display control unit 14*b* of the electronic whiteboard 1*b* controls the display 180 of the electronic whiteboard 1*b* to display the screen as illustrated in FIG. 22B (step S60). Before this step, the display 180 of the electronic whiteboard 1*b* displays an image v1 of the site A and a share button b2 that is pressed to share data. In response to receipt of the upload start notification at step S59, the electronic whiteboard 1*b* outputs data for displaying an hourglass icon c2 that visualizes the passage of time taken to download the background image data.

The passage of time may be expressed by a still image of an hourglass or a moving image of an hourglass with moving sand. The hourglass icon c2 is an example of schedule information indicating that image data is scheduled to be downloaded. Other examples of the schedule information include an icon other than the hourglass icon (e.g., a clock icon), a character (and/or a symbol) replacing the icon, and a combination of an icon and a character (and/or a symbol). Further, the schedule information may be notified by sound. In this case, the schedule information is output as sound from the speaker 150 by the image and audio processing unit 13*a*, not by the display control unit 14*a*.

Then, the user UA1 at the site A moves the electronic pen 190 or the hand H in contact with the display 180 of the electronic whiteboard 1*a*, and the receiving unit 12*a* receives the input of the stroke (i.e., trajectory) of the movement (step S61). Based on the input stroke, the image processing unit 16*a* then generates stroke data (e.g., the data of coordinates (x, y)) for displaying a stroke image on the two-dimensional display 180 (step S62). Then, the display control unit 14a controls the display 180 of the electronic whiteboard 1a to display the stroke image (step S63). Thereby, a stroke image stA is displayed, as illustrated in FIG. 22C.

Then, the communication unit 11a transmits, to the communication management apparatus 5, the stroke data generated at step S62 to reproduce the stroke image (step S64). Then, the communication unit 51 of the communication management apparatus 5 receives the stroke data transmitted from the electronic whiteboard 1a.

The shared data managing unit 57 of the communication management apparatus 5 then stores the stroke data received at step S64 in the shared data management DB 5006 (see FIG. 14) (step S65). In this case, the shared data managing unit 57 stores the items of the stroke data received by the communication unit 51 in the shared data management table sequentially (i.e., in the generation order of the items of the stroke data) in association with the meeting ID (i.e., the session ID) identifying the currently held remote conference, as illustrated in FIG. 14. The shared data managing unit 57 further assigns a global ID (gid) to the stroke data received at step S64.

Then, the communication unit 51 transmits the stroke data stored at step S65 and the global ID (gid) assigned by the shared data managing unit 57 to the electronic whiteboard 1a (step S66). Then, the electronic whiteboard 1a receives the stroke data and the global ID (gid) transmitted from the communication management apparatus 5. Thereby, the electronic whiteboard 1a is notified that the stroke data has been received, and is also notified of the assigned global ID (gid).

The communication unit 51 further transmits the stroke data and global ID (gid) to the electronic whiteboard 1b, with which the electronic whiteboard 1a is having the remote conference (step S67). Then, the communication unit 11b of the electronic whiteboard 1b receives the stroke data and the global ID (gid) transmitted from the communication management apparatus 5. The image processing unit 16b of the electronic whiteboard 1b then generates the stroke image based on the stroke data received by the communication unit 11b (step S68). Then, the display control unit 14b of the electronic whiteboard 1b controls the display 180 of the electronic whiteboard 1b to display the stroke image generated at step S68 (step S69). Thereby, the electronic whiteboard 1b displays the same stroke image stA as that displayed on the counterpart electronic whiteboard 1a, as illustrated in FIG. 22D. The communication system 10 thus enables the stroke image rendered on the electronic whiteboard 1a to be shared by the electronic whiteboard 1b.

Then, as illustrated in FIG. 21, the communication unit 71 of the image storing apparatus 7 transmits an upload completion notification to the electronic whiteboard 1a to notify that the upload of the background image data has been completed (step S71). The upload completion notification includes the URL representing the storage location of the uploaded background image data. Then, the communication unit 11a of the electronic whiteboard 1a receives the upload completion notification transmitted from the image storing apparatus 7.

The communication unit 11a of the electronic whiteboard 1a forwards the upload completion notification received at step S71 to the communication management apparatus 5 (step S72). Then, the communication unit 51 of the communication management apparatus forwards the upload completion notification received at step S72 to the electronic whiteboard 1b (step S73). Then, the communication unit 11b of the electronic whiteboard 1b receives the upload completion notification transmitted from the communication management apparatus 5.

The communication unit 11b of the electronic whiteboard 1b transmits a download request to the image storing apparatus 7 to request download of the background image data from the URL received at step S73, i.e., the URL representing the storage location in the image storing apparatus 7 (step S74). Then, the communication unit 71 of the image storing apparatus 7 receives the download request transmitted from the electronic whiteboard 1b.

Then, based on the URL included in the download request received by the communication unit 71, the storing and reading unit 79 of the image storing apparatus 7 reads the requested background image data from the storage unit 7000 (step S75). The communication unit 71 then transmits the requested background image data to the electronic whiteboard 1b as the source of the download request. Then, the communication unit 11b of the electronic whiteboard 1b downloads (i.e., receives) the background image data (step S76). Then, the display control unit 14b of the electronic whiteboard 1b controls the display 180 of the electronic whiteboard 1b to display the background image based on the background image data downloaded (i.e., received) by the communication unit 11b (step S77). Specifically, the display control unit 14b displays, on the screen illustrated in FIG. 22D, the same background image dA as that illustrated in FIG. 22C, and stops displaying the hourglass icon c2.

Thereby, the electronic whiteboards 1a and 1b share the stroke image and the background image displayed on the display 180. The background image data of the background image displayed on one of the electronic whiteboards 1a and 1b (e.g., the electronic whiteboard 1a) is uploaded to the image storing apparatus 7 to be downloadable to the other one of the electronic whiteboards 1a and 1b (e.g., the electronic whiteboard 1b). Further, the stroke data of the stroke rendered on one of the electronic whiteboards 1a and 1b (e.g., the electronic whiteboard 1a) is shared by the other one of the electronic whiteboards 1a and 1b (e.g., the electronic whiteboard 1b) via the communication management apparatus 5. The electronic whiteboards 1a and 1b also share, via the communication management apparatus 5, the operation information (see FIG. 8) of the operation such as generating the display screen (i.e., the page) to be displayed on the electronic whiteboards 1a and 1b or changing the display screen (i.e., the page). The process of steps S51 to S60 to start uploading the background image data to the image storing apparatus 7 from the electronic whiteboard 1a and the stroke data sharing process of steps S61 to S69 may be reversed in order, or may be executed in parallel.

The display screen shared by the electronic whiteboards 1a and 1b will be described with FIGS. 23A, 23B, and 23C.

Figure 23A:
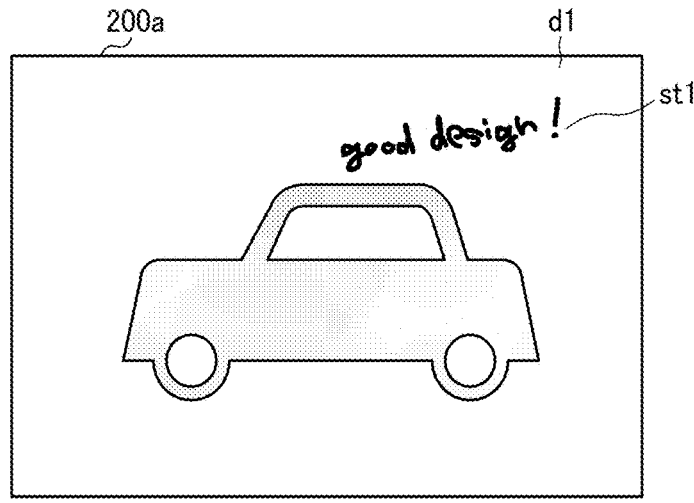
FIGS. 23A, 23B, and 23C are diagrams illustrating examples of a display screen shared by the electronic whiteboards of the embodiment.

A display screen 200a illustrated in FIG. 23A displays a background image d1 and a stroke image st1. A display screen 200b illustrated in FIG. 23B displays a background image d2 and a stroke image st2. A display screen 200c illustrated in FIG. 23C displays a background image d3 and a stroke image st3.

Figure 23B:
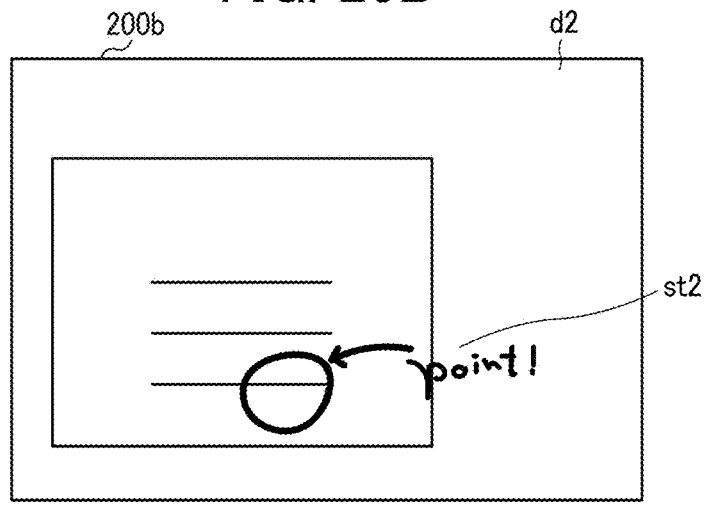
Figure 23C:
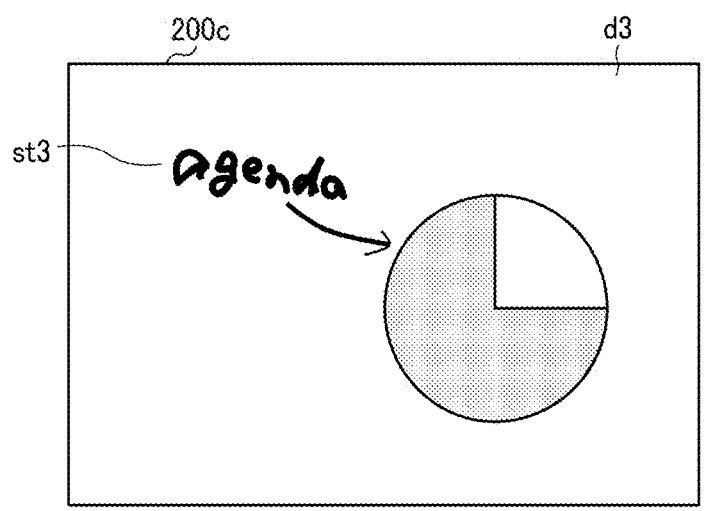

The electronic whiteboards 1a and 1b thus share a plurality of display screens such as those illustrated in FIGS. 23A to 23C. The electronic whiteboards 1a and 1b further manage, as the display screen information illustrated in FIG. 7, the screen data (i.e., the background image data and the stroke data) forming the display screen displayed on the display 180. For example, the display screen 200a illustrated in FIG. 23A corresponds to the screen data of the page P1, and the display screen 200b illustrated in FIG. 23B corresponds to the screen data of the page P2. Further, for example, the display screen 200c illustrated in FIG. 23C corresponds to the screen data of the page P3. The display screens 200a to 200c illustrated in FIGS. 23A to 23C are examples of the display screen displayed on the display 180.

As described above, when the electronic whiteboard 1a transmits the background image data of the background image and then the stroke data of the stroke image, the stroke data reaches the counterpart electronic whiteboard 1b before the background image data does, since the data size of the stroke data is substantially smaller than that of the background image data. In the embodiment, therefore, when the electronic whiteboard 1a uploads the image data, the communication management apparatus 5 receives the upload start notification from the electronic whiteboard 1a, and forwards (i.e., transmits) the upload start notification to the electronic whiteboard 1b, as in step S59 in FIG. 19. Then, the electronic whiteboard 1b outputs the data for displaying the hourglass icon c2, as illustrated in FIG. 22B, to visually notify that the background image data is going to be downloaded, as in step S60 in FIG. 19. When the display of the stroke image is in progress, therefore, the users UB1 and UB2 of the electronic whiteboard 1b at the site B realize that there is a background image (e.g., the image of a material) to be later transmitted to the electronic whiteboard 1b. With this realization, the users UB1 and UB2 are able to smoothly communicate with the user UA1 of the electronic whiteboard 1a at the site A.

Rendering Process According to Editing Authority

With reference to FIGS. 24 to 28, a description will be given of a rendering process performed on an electronic whiteboard 1 in accordance with the editing authority set for the operation target in a remote conference (i.e., video conference) taking place with a plurality of electronic whiteboards 1 at a plurality of sites. The following description will be given of an example in which the remote conference is held between the electronic whiteboards 1a and 1b, i.e., between two sites. However, the number of sites or electronic whiteboards 1 used in the remote conference is not necessarily two, and the remote conference may be held between any number of sites or electronic whiteboards 1.

FIG. 24 is a sequence diagram illustrating an example of the rendering process performed on one of the electronic whiteboards 1 in the communication system 10 of the embodiment in accordance with the editing authority.

With reference to FIG. 24, a description will be given of an example in which a predetermined operation is performed on a display screen 200aa illustrated in FIG. 25A by the user UA1 of the electronic whiteboard 1a.

Figure 25A:
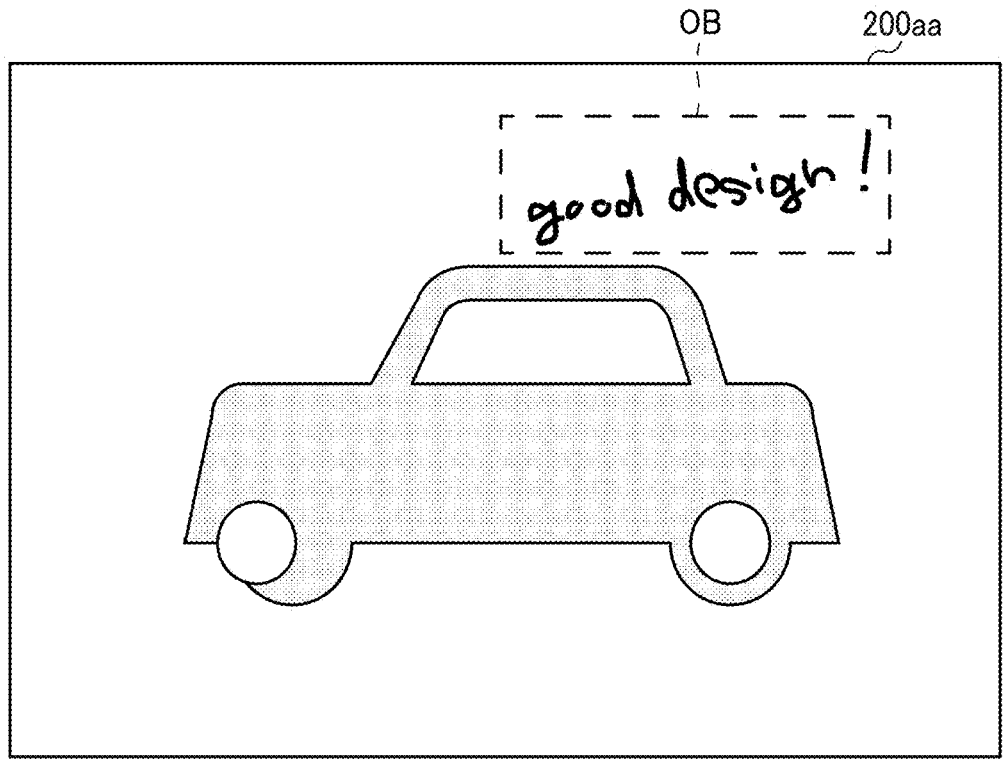
FIGS. 25A and 25B are diagrams illustrating examples of a display screen displayed on the electronic whiteboards of the embodiment.
Figure 25B:
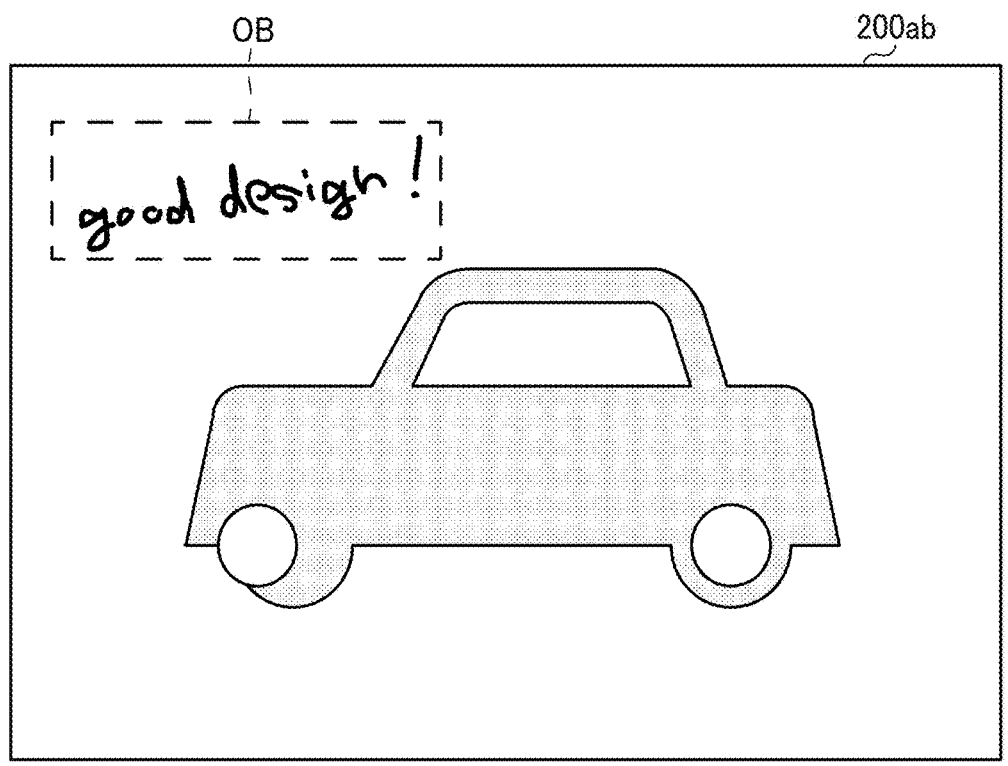

The display screen 200aa illustrated in FIG. 25A includes an object OB, which is a set of stroke data items of strokes rendered on the display screen 200a illustrated in FIG. 23A. Herein, the object may be a stroke formed with coordinate points connected together, optical character reader (OCR)-processed text of a stroke recognized as a letter, a character, or a symbol such as a numerical symbol, a system-generated character representing the date or time, a particular figure such as a triangle, a star, or a circle, an image usable with a particular application program such as a pictogram or illustration, an arrow, a line segment, or a line such as a Bezier curve, for example. The above-described information displayed on the display 180 based on the rendering operation by a user will be referred to as the object. The object OB displayed on the display screen 200aa in FIG. 25A is an example of a particular object.

When the user UA1 of the electronic whiteboard 1a moves the object OB displayed on the display screen 200aa with the electronic pen 190, for example, the receiving unit 12a receives the user operation performed on the object OB (step S101). For example, the user UA1 moves the object OB on the display screen 200aa toward the upper-left side of the display screen 200aa, thereby obtaining a display screen 200ab illustrated in FIG. 25B. Then, the communication unit 11a transmits an object operation request to the communication management apparatus 5 to request the operation on the object OB displayed on the page (step S102). The object operation request includes the data forming the object OB as the operation target (hereinafter also referred to as the operation target object). In this case, the object operation request includes the stroke data forming the object OB. Then, the communication unit 51 of the communication management apparatus 5 receives the object operation request transmitted from the electronic whiteboard 1a.

The operation on an object (also referred to as the object operation) is not limited to moving the object. Thus, the object operation may be editing the object such as zooming-in, zooming-out, or deleting the object, adding or deleting a stroke, or changing the hue. In the following description, the operation on the display screen is assumed to be performed on an object as a set of stroke data items displayed on the display screen. The operation on the display screen, however, may be performed on a stroke displayed on the display screen.

Then, based on the object operation request received by the communication unit 51, the communication management apparatus 5 determines the editing authority of the operation target object (step S103).

An editing authority determination process performed by the communication management apparatus 5 on a stroke forming the operation target object will be described in detail with FIG. 26.

Figure 26:
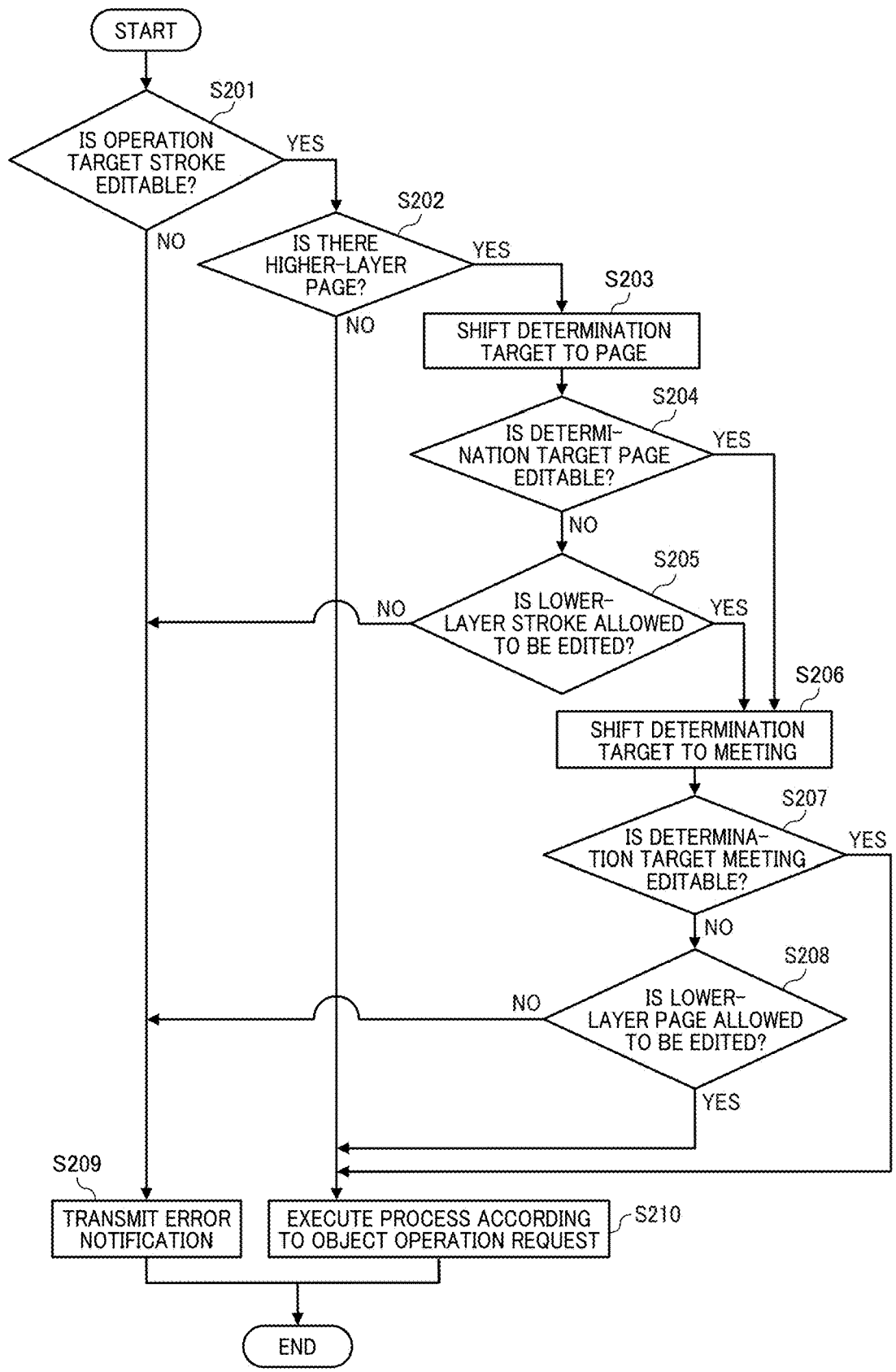
FIG. 26 is a flowchart illustrating an example of an editing authority determination process by the communication management apparatus of the embodiment to determine editing authority of an operation target stroke.

FIG. 26 is a flowchart illustrating an example of the editing authority determination process performed by the communication management apparatus 5 of the embodiment to determine the editing authority of the stroke of the operation target (hereinafter also referred to as the operation target stroke).

Based on the editability information stored in the shared data management DB 5006, the determination unit 53 determines the editability of the stroke as the operation target object (step S201). If the editability information associated with the ID of the operation target stroke is "lock," the determination unit 53 determines that the operation target stroke is not allowed to be edited (NO at step S201), and the communication management apparatus 5 proceeds to the process of step S209. If the editability information associated with the ID of the operation target stroke is "unlock," on the other hand, the determination unit 53 determines that the operation target stroke is allowed to be edited (YES at step S201), and the communication management apparatus 5 proceeds to the process of step S202.

The determination unit 53 then determines whether the operation target stroke has a higher-layer page (step S202). If the information "parent" representing a higher-layer (i.e., parent) page associated with the ID of the operation target stroke is stored in the shared data management DB 5006, the determination unit 53 determines that the operation target stroke has a higher-layer page (YES at step S202), and the communication management apparatus 5 proceeds to the process of step S203. If the information "parent" representing a higher-layer (i.e., parent) page associated with the ID of the operation target stroke is not stored in the shared data management DB 5006, on the other hand, the determination unit 53 determines that the operation target stroke has no higher-layer page (NO at step S202), and the communication management apparatus 5 proceeds to the process of step S210.

Then, at step S203, the determination unit 53 shifts the determination target to the higher-layer page determined to exist at step S202. The determination unit 53 then determines the editability of the higher-layer page (hereinafter referred to as the determination target page) (step S204). If the editability information associated with the ID of the determination target page is "lock," the determination unit 53 determines that the determination target page is not allowed to be edited (NO at step S204), and the communication management apparatus 5 proceeds to the process of step S205. If the editability information associated with the ID of the determination target page is "unlock," on the other hand, the determination unit 53 determines that the determination target page is allowed to be edited (YES at step S204), and the communication management apparatus 5 proceeds to the process of step S206.

Then, at step S205, based on the lower-layer editability information stored in the shared data management DB 5006, the determination unit 53 determines the editability of the stroke, which is lower-layer data of the determination target page. If the lower-layer editability information associated with the ID of the determination target page is "lock," the determination unit 53 determines that the stroke as the lower-layer data is not allowed to be edited (NO at step S205), and the communication management apparatus 5 proceeds to the process of step S209. If lower-layer editability information associated with the ID of the determination target page is "unlock," on the other hand, the determination unit 53 determines that the stroke as the lower-layer data is allowed to be edited (YES at step S205), and the communication management apparatus 5 proceeds to the process of step S206.

At step S206, the determination unit 53 then shifts the determination target to the meeting taking place on the electronic whiteboard 1a (step S206). Then, the determination unit 53 determines the editability of the meeting (i.e., the meeting information) as the determination target (hereinafter referred to as the determination target meeting) (step S207). If the editability information associated with the ID of the determination target meeting is "lock," the determination unit 53 determines that the determination target meeting is not allowed to be edited (NO at step S207), and the communication management apparatus 5 proceeds to the process of step S208. If the editability information associated with the ID of the determination target meeting is "unlock," on the other hand, the determination unit 53 determines that the determination target meeting is allowed to be edited (YES at step S207), and the communication management apparatus 5 proceeds to the process of step S210.

Then, at step S208, based on the lower-layer editability information stored in the shared data management DB 5006, the determination unit 53 determines the editability of the page as the lower-layer data of the determination target meeting. If the lower-layer editability information associated with the ID of the determination target meeting is "lock," the determination unit 53 determines that the page as the lower-layer data of the determination target meeting is not allowed to be edited (NO at step S208), and the communication management apparatus 5 proceeds to the process of step S209. If the lower-layer editability information associated with the ID of the determination target meeting is "unlock," on the other hand, the determination unit 53 determines that the page as the lower-layer data of the determination target meeting is allowed to be edited (YES at step S208), and the communication management apparatus 5 proceeds to the process of step S210.

Then, at step S209, the communication unit 51 transmits an error notification to the electronic whiteboard 1a to notify the failure of the object operation. Step S209 corresponds to Step S104b in FIG. 24. At step S210, the communication management apparatus 5 executes the process according to the object operation request received at step S102 in FIG. 24.

As described above, the communication management apparatus 5 manages the data items of the display screen shared by the electronic whiteboards 1a and 1b in association with each other in the hierarchical structure (i.e., tree structure). When determining the editing authority of the operation target (e.g., the stroke), therefore, the communication management apparatus 5 determines not only whether the operation target stroke is editable but also whether the editing of the stroke is allowed by the higher-layer page, thereby preventing inconsistency in editing operation between the electronic whiteboards 1a and 1b due to contention for operation.

Although FIG. 26 illustrates an example in which the operation target object is a stroke or a set of a plurality of strokes, the operation target object may also be a page.

Figure 27:
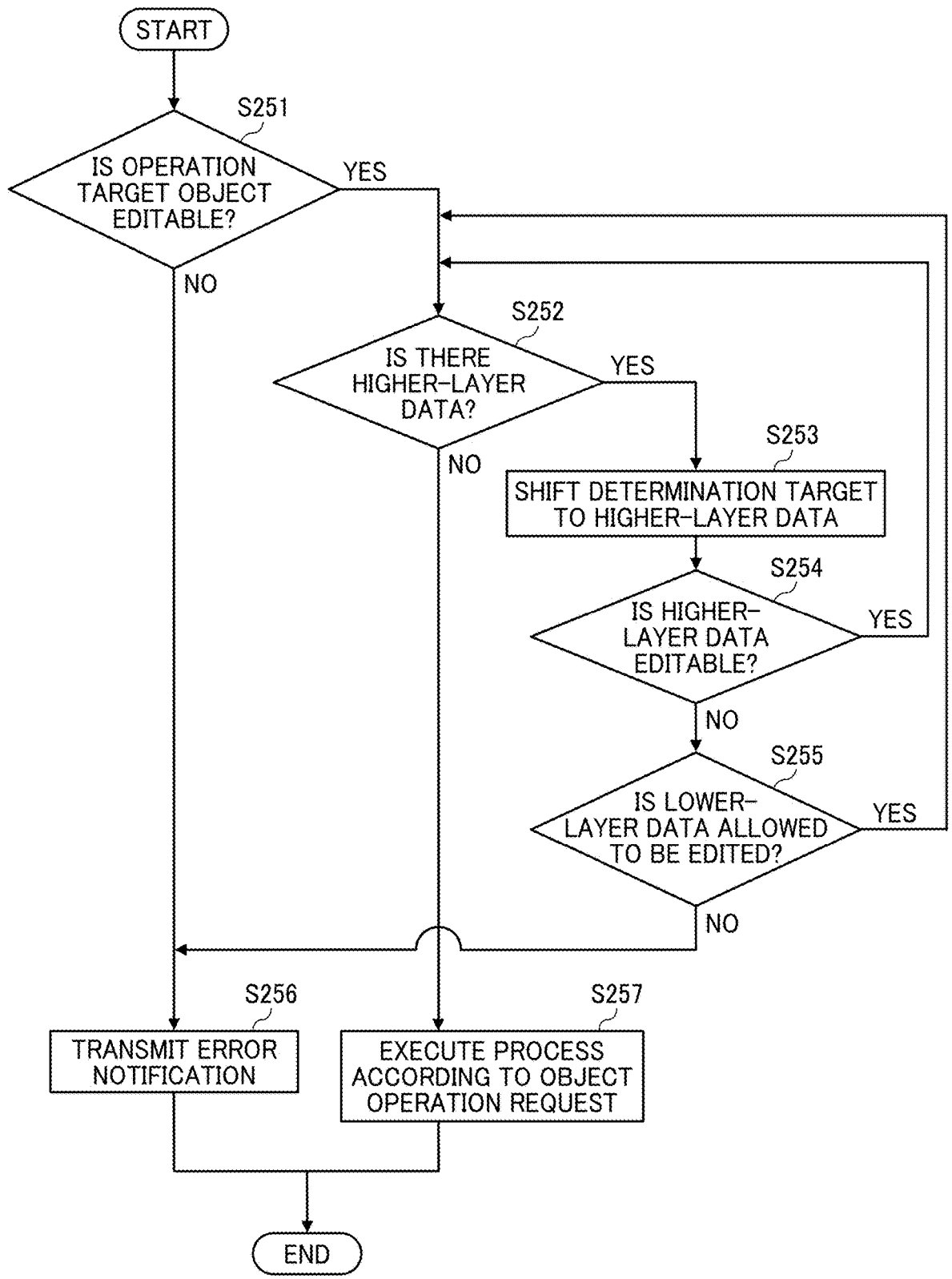
FIG. 27 is a flowchart illustrating an example of an editing authority determination process by the communication management apparatus of the embodiment to determine editing authority of an operation target.

With reference to FIG. 27, a description will be given of a procedure of an editing authority determination process in which the operation target object is not limited to the stroke.

Based on the information of the editing authority stored in the shared data management DB 5006, the determination unit 53 first determines the editability of the operation target object (step S251). If the editability information associated with the ID of the operation target object is "lock," the determination unit 53 determines that the operation target object is not allowed to be edited (NO at step S251), and the communication management apparatus 5 proceeds to the process of step S256. If the editability information associated with the ID of the operation target object is "unlock," on the other hand, the determination unit 53 determines that the operation target object is allowed to be edited (YES at step S251), and the communication management apparatus 5 proceeds to the process of step S252.

The determination unit 53 then determines whether the operation target object has higher-layer data (step S252). If the information "parent" representing a higher-layer (i.e., parent) data associated with the ID of the operation target object is stored in the shared data management DB 5006, the determination unit 53 determines that the operation target object has higher-layer data (YES at step S252), and the communication management apparatus 5 proceeds to the process of step S253. If the information "parent" representing a higher-layer (i.e., parent) data associated with the ID of the operation target object is not stored in the shared data management DB 5006, on the other hand, the determination unit 53 determines that the operation target object has no higher-layer data (NO at step S252), and the communication management apparatus 5 proceeds to the process of step S257.

Then, at step S253, the determination unit 53 shifts the determination target to the higher-layer data determined to exist at step S252. The determination unit 53 then determines the editability of the higher-layer data as the determination target (hereinafter referred to as the determination target layer data) (step S254). If the editability information associated with the ID of the determination target layer data is "lock," the determination unit 53 determines that the determination target layer data is not allowed to be edited (NO at step S254), and the communication management apparatus 5 proceeds to the process of step S255. If the editability information associated with the ID of the determination target layer data is "unlock," on the other hand, the determination unit 53 determines that the determination target layer data is allowed to be edited (YES at step S254), and the communication management apparatus 5 repeats the processes of step S252 and the subsequent steps.

Then, at step S255, based on the lower-layer editability information stored in the shared data management DB 5006, the determination unit 53 determines the editability of lower-layer data of the determination target layer data (i.e., the higher-layer data). If the lower-layer editability information associated with the ID of the determination target layer data (i.e., the higher-layer data) is "lock," the determination unit 53 determines that the lower-layer data of the determination target layer data is not allowed to be edited (NO at step S255), and the communication management apparatus 5 proceeds to the process of step S256. If the lower-layer editability information associated with the ID of the determination target layer data (i.e., the higher-layer data) is "unlock," on the other hand, the determination unit 53 determines that the lower-layer data of the determination target layer data is allowed to be edited (YES at step S255), and the communication management apparatus 5 repeats the processes of step S252 and the subsequent processes.

At step S256, the communication unit 51 transmits an error notification to the electronic whiteboard 1a to notify the failure of the object operation. At step S257, the communication management apparatus 5 executes the process according to the object operation request received at step S102 in FIG. 24.

As described above, even if the operation target object is data other than the stroke data, the communication management apparatus 5 is capable of determining the editability of the lower-layer data of the determination target layer data (i.e., the higher-layer data) by using the hierarchal structure of the data.

Referring back to FIG. 24, the description of the rendering process according to the editing authority will be continued. A description will first be given of the process executed when it is determined in the procedure of FIG. 26 that there is editing authority to edit the operation target object, i.e., the process of step S210 in FIG. 26.

In response to receipt of the object operation request transmitted from the electronic whiteboard 1a, the communication unit 51 transmits a success notification to the electronic whiteboard 1a to notify the success of the object operation (step S104a). Then, the communication unit 11a of the electronic whiteboard 1a receives the success notification transmitted from the communication management apparatus 5. The communication unit 51 further transmits a lock notification to the electronic whiteboard 1b to notify the restriction of the operation on the page P1 (step S105a). Then, the communication unit 11b of the electronic whiteboard 1b receives the lock notification transmitted from the communication management apparatus 5.

Then, the communication management apparatus 5 sets the editing authority according to the object operation (step S106a). Details of the editing authority setting process will be described later. The display control unit 14a of the electronic whiteboard 1a controls the display 180 of the electronic whiteboard 1a to display the display screen 200ab (see FIG. 25B) resulting from the operation on the object OB (step S107a). Then, the communication unit 11a of the electronic whiteboard 1a transmits a transmission completion notification to the communication management apparatus 5 to notify that the stroke data related to the object operation received at step S101 has been transmitted (step S108a). Then, the communication unit 51 of the communication management apparatus 5 receives the transmission completion notification transmitted from the electronic whiteboard 1a. The communication unit 51 of the communication management apparatus 5 then transmits the transmission completion notification transmitted from the electronic whiteboard 1a to the electronic whiteboard 1b (step S109a). Then, the communication unit 11b of the electronic whiteboard 1b receives the transmission completion notification transmitted from the communication management apparatus 5.

Then, the display control unit 14b of the electronic whiteboard 1b controls the display 180 of the electronic whiteboard 1b to display the display screen 200ab (see FIG. 25B) generated by the image processing unit 16b based on the stroke data indicated in the transmission completion notification received by the communication unit 11b (step S110a). The electronic whiteboard 1b thus controls the display 180 to display the display screen reflecting the object operation (e.g., the movement of the object) executed by the electronic whiteboard 1a.

A description will be given of the process executed when it is determined in the procedure of FIG. 26 that there is no editing authority to edit the operation target object, i.e., the process of step S209 in FIG. 26.

If it is determined by the determination unit 53 that there is no editing authority to edit the object corresponding to the operation request, the communication unit 51 of the communication management apparatus 5 transmits an error notification to the electronic whiteboard 1a, which has transmitted the object operation request, to notify the failure of the object operation (step S104b). Then, the communication unit 11a of the electronic whiteboard 1a receives the error notification transmitted from the communication management apparatus 5. Then, the electronic whiteboard 1a controls the display 180 of the communication unit 11a to display an image representing the error notification, for example, to thereby notify the user UA1 of the failure of the object operation.

As described above, according to the communication system 10 of the embodiment, the data of the display screen shared by the electronic whiteboards 1a and 1b is expressed in the hierarchical (i.e., tree) structure, and is shared by the electronic whiteboards 1a and 1b via the communication management apparatus 5. In the communication system 10, therefore, if the operation request is transmitted to the communication management apparatus 5 from the electronic whiteboard 1a, for example, the communication management apparatus 5 determines not only whether the object corresponding to the operation request is individually locked but also whether the object as lower-layer data of certain data (i.e., higher-layer data) is editable. Thereby, the communication system 10 of the embodiment prevents the inconsistency in editing operation between the electronic whiteboards 1a and 1b due to the contention for operation.

Editing Authority Setting Process

The editing authority setting process of step S106a in FIG. 24 will be described in detail with FIG. 28.

Figure 28:
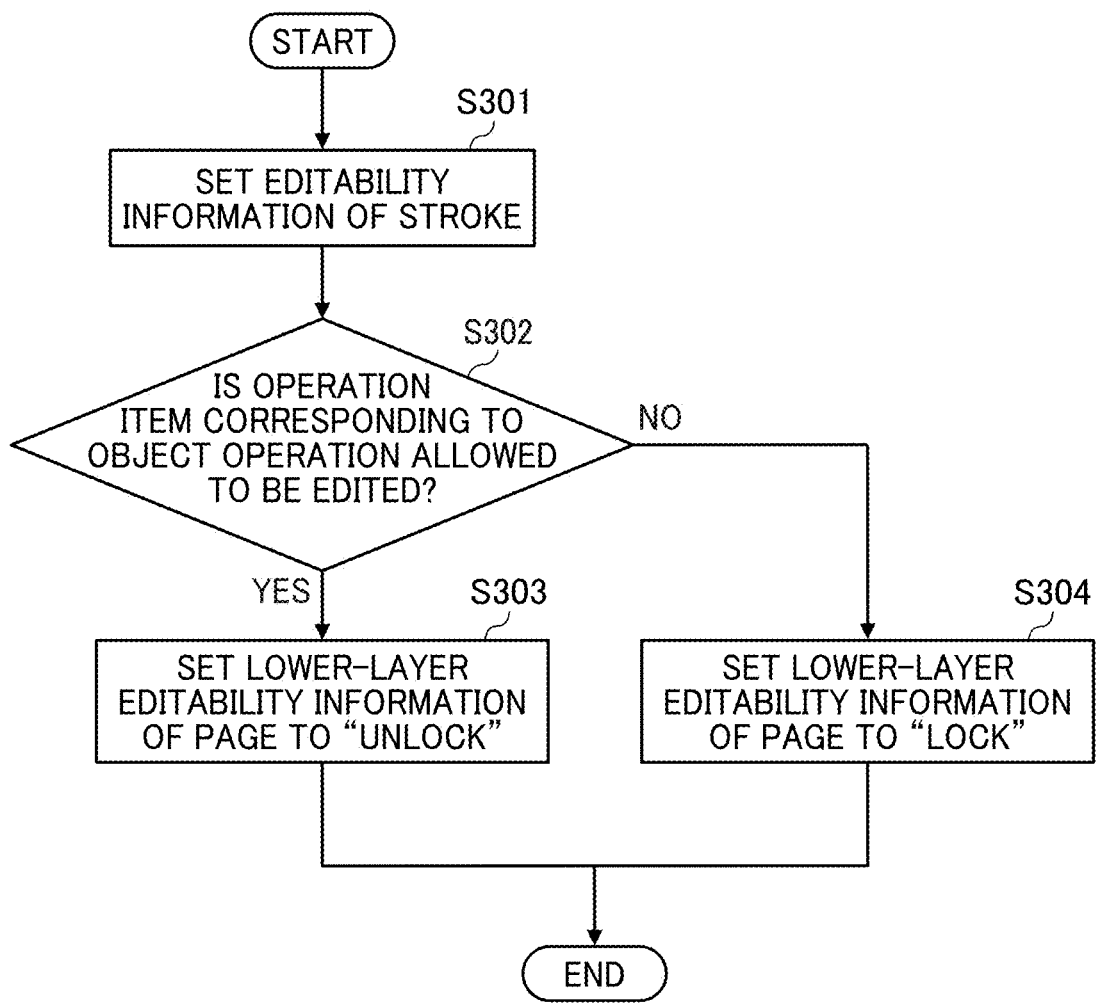
FIG. 28 is a flowchart illustrating an example of an editing authority setting process by the communication management apparatus of the embodiment.

FIG. 28 is a flowchart illustrating an example of the editing authority setting process executed in the communication management apparatus 5 of the embodiment.

The setting unit 58 of the communication management apparatus 5 first sets the editability information of each stroke forming the operation target object (step S301). Specifically, the setting unit 58 changes the editability information associated with the ID of the operation target stroke stored in the shared data management DB 5006 to "lock" from "unlock."

Then, with reference to the lower-layer setting condition management DB 5007, the determination unit 53 determines the editing authority of the operation item corresponding to the object operation received at step S101 (step S302). Specifically, if the setting information of the operation item corresponding to the object operation is "unlock," the determination unit 53 determines that the operation item is editable (YES at step S302), and the communication management apparatus 5 proceeds to the process of step S303. If the setting information of the operation item corresponding to the object operation is "lock," on the other hand, the determination unit 53 determines that the operation item is not editable (NO at step S302), and the communication management apparatus 5 proceeds to the process of step S304.

Then, at step S303, the setting unit 58 sets the lower-layer editability information in the shared data management DB 5006 associated with the ID of the page in a higher layer of the operation target stroke to "unlock." At step S304, on the other hand, the setting unit 58 sets the lower-layer editability information in the shared data management DB 5006 associated with the ID of the page in a higher layer of the operation target stroke to "lock."

As described above, in response to receipt of the object operation request from the electronic whiteboard 1a, the communication management apparatus 5 executes not only the lock setting of the object per se but also the lock setting of lower-layer (i.e., child) data of the object in accordance with the operation. For example, in the case of an operation such as switching pages or updating additional information of the page, the stroke held as lower-layer data of the page may be editable without problems. The communication management apparatus 5 therefore may previously store the operation items for which the lower-layer editability information is set, to thereby reduce the frequency of errors in response to the operation request from the electronic whiteboard 1. In the communication system 10, therefore, the lock setting of the lower-layer data is autonomously set by the communication management apparatus 5. When transmitting the operation request to the communication management apparatus 5 from a certain site, therefore, it is unnecessary to provide the communication management apparatus 5 with information for lock setting, thereby simplifying application programs for the electronic whiteboards 1a and 1b.

The communication management apparatus 5 may execute the lock setting of the lower-layer data in accordance with request information transmitted from the electronic whiteboard 1a to request to lock the lower-layer data. In this case, the communication unit 11a of the electronic whiteboard 1a transmits, to the communication management apparatus 5, the object operation request and the request information for requesting to lock the lower-layer data of the object. In response to receipt of the request information, the setting unit 58 of the communication management apparatus 5 sets the lower-layer editability information. In the communication system 10, therefore, it is possible to specify the editability of data from the electronic whiteboard 1a. For example, in the case of an operation for which it is unnecessary to prohibit the editing of the lower-layer data, the user UA1 of the electronic whiteboard 1a is able to explicitly allow the editing of the lower-layer data.

As described above, a communication management apparatus of an embodiment of the present invention is the communication management apparatus 5 that manages the data of the display screen shared by a plurality of communication terminals (e.g., the electronic whiteboards 1a and 1b). The communication management apparatus 5 stores a hierarchical data structure in which each of a plurality of pages forming the display screen is associated with one or more objects included in the page. The communication management apparatus 5 further receives, from the electronic whiteboard 1a, the operation request that requests an operation on a particular object of the one or more objects. When the editing of the particular object corresponding to the received operation request and the editing of data in a lower layer associated with a higher layer of the particular object are both allowed, the communication management apparatus 5 transmits the success notification to the electronic whiteboard 1a to notify the success of the operation on the particular object. In response to receipt of the operation request from the electronic whiteboard 1a, therefore, the communication management apparatus 5 executes the operation when the editing of the particular object corresponding to the operation request and the editing of the data in the lower layer associated with the higher layer of the particular object are both allowed. Thereby, the communication management apparatus 5 prevents the inconsistency in editing operation between the electronic whiteboards 1a and 1b due to the contention for operation.

Further, when the editing of the particular object corresponding to the received operation request is allowed but the editing of the data in the lower layer associated with the higher layer of the particular object is prohibited, the communication management apparatus 5 of the embodiment transmits the error notification to the electronic whiteboard 1a (an example of one communication terminal) to notify the failure of the operation on the particular object. When the editing of the particular object corresponding to the operation request is allowed but the editing of the data in the lower layer associated with the higher layer of the particular object is prohibited, therefore, the communication management apparatus 5 restricts the operation, thereby preventing the inconsistency in editing operation between the electronic whiteboards 1a and 1b due to the contention for operation.

The communication management apparatus 5 of the embodiment further stores the editability information representing the editability of the data in each of a plurality of layers forming the hierarchical data structure. When one layer of the plurality of layers has a lower layer, the communication management apparatus 5 stores the lower-layer editability information, which represents the editability of the data in the lower layer, in association with the one layer. Further, the communication management apparatus 5 determines the editing authority of the operation target based on the stored editability information and lower-layer editability information. In the communication management apparatus 5, therefore, the items of the data of the display screen shared by the electronic whiteboards 1a and 1b are managed in association with each other in the hierarchical data structure. When determining the editing authority of the operation target, therefore, the communication management apparatus determines not only whether the operation target stroke is editable but also whether the editing of the stroke is allowed by the page in the higher layer. Thereby, the communication management apparatus 5 prevents the inconsistency in editing operation between the electronic whiteboards 1a and 1b due to the contention for operation.

Further, when it is determined that there is editing authority to edit the operation target corresponding to the received operation request, the communication management apparatus 5 of the embodiment sets the editability information associated with the particular object to the locked status to indicate that the editing of the particular object is restricted. When the editability information is set to the locked status, the communication management apparatus 5 determines that the editing of the operation target is prohibited. Further, when it is determined that there is editing authority to edit the operation target, the communication management apparatus 5 sets the lower-layer editability information in accordance with the operation corresponding to the received operation request. The communication management apparatus 5 thus autonomously executes the lock setting of the data in the lower layer. When transmitting the operation request to the communication management apparatus 5 from a certain site, therefore, it is unnecessary to provide the communication management apparatus 5 with the information for lock setting, thereby simplifying the application programs for the electronic whiteboards 1a and 1b.

The communication management apparatus 5 of the embodiment further receives, from the electronic whiteboard 1a (an example of the one communication terminal), the request information that requests the setting of the editability of the data in the lower layer of the particular object corresponding to the operation request, and sets the lower-layer editability information in accordance with the received request information. According to the communication management apparatus 5, therefore, the editability of the data in the lower layer is specifiable from the electronic whiteboard 1a. Therefore, in the case of an operation for which it is unnecessary to prohibit the editing of the data in the lower layer, for example, the user UA1 of the electronic whiteboard 1a is able to explicitly allow the editing of the data in the lower layer.

A communication system of an embodiment of the present invention is the communication system 10 including the communication management apparatus 5 and the electronic whiteboard 1a (an example of a communication terminal). The electronic whiteboard 1a receives the operation request that requests an operation on a particular object of one or more objects displayed on the display screen 200aa. Further, in response to receipt, from the communication management apparatus 5, of the success notification that notifies the success of the operation on the particular object, the electronic whiteboard 1a causes the display 180 (an example of a display) to display the display screen 200ab reflecting the operation according to the operation request. Therefore, when the operation request is transmitted to the communication management apparatus 5 from the electronic whiteboard 1a, for example, the communication management apparatus 5 determines not only whether the object according to the operation request is individually locked but also whether the object as lower-layer data of certain data (i.e., higher-layer data) is editable. Consequently, the communication system 10 of the embodiment prevents the inconsistency in editing operation between the electronic whiteboards 1a and 1b due to the contention for operation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The various tables of the embodiment described above may be generated as a result of machine learning. The mutually associated data items in each of the tables may be categorized by machine learning to obviate the need for the tables. Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions. Further, the above-described steps are not limited to the order disclosed herein.

The invention claimed is:

1. A communication management apparatus comprising:
a memory that stores a hierarchical data structure in which each page of a plurality of pages forming a display screen shared by a plurality of communication terminals is associated with one or more objects included in the each page; and
circuitry configured to
receive, from one communication terminal of the plurality of communication terminals, an operation request that requests an operation on a particular object of the one or more objects, and
transmit a success notification to the one communication terminal to notify success of the operation on the particular object, when editing of the particular object and editing of data in a lower layer associated with a higher layer of the particular object are both allowed,
wherein the memory stores editability information representing editability of data in each of a plurality of layers forming the hierarchical data structure,
wherein when one layer of the plurality of layers has a lower layer, the memory stores lower-layer editability information in association with the one layer, the lower-layer editability information representing editability of data in the lower layer,
wherein the circuitry determines editing authority of an operation target based on the editability information and the lower-layer editability information stored in the memory,
wherein when it is determined that there is editing authority to edit the operation target, the circuitry sets the editability information associated with the particular object to a locked status to indicate that the editing of the particular object is restricted, and
wherein when the editability information is set to the locked status, the circuitry determines that editing of the operation target is prohibited.

2. The communication management apparatus of claim 1, wherein:
the circuitry transmits an error notification to the one communication terminal to notify failure of the operation on the particular object, when the editing of the particular object is allowed but the editing of the data in the lower layer associated with the higher layer of the particular object is prohibited.

3. The communication management apparatus of claim 1, wherein:

the circuitry transmits an error notification to the one communication terminal to notify failure of the operation on the particular object, when it is determined that there is editing authority to edit the operation target.

4. The communication management apparatus of claim 1, wherein:

the circuitry receives, from the one communication terminal, request information that requests setting of the editability of the data in the lower layer of the particular object, and the circuitry sets the lower-layer editability information in accordance with the request information.

5. The communication management apparatus of claim 1, wherein:

the particular object is a stroke image rendered on the display screen, and stroke data forming the stroke image and a page of the plurality of pages on which the stroke image is rendered are associated with each other in the hierarchical data structure stored in the memory.

6. A communication system comprising:

the communication management apparatus of claim 1; and a communication terminal that shares a display screen with another communication terminal, the communication terminal including another circuitry configured to receive an operation request that requests an operation on a particular object of one or more objects included in a page forming the display screen, and in response to receipt, from the communication management apparatus, of a success notification that notifies success of the operation on the particular object, cause a display to display the display screen to reflect the operation according to the operation request in the display screen.

7. A communication method comprising:

storing, in a memory, a hierarchical data structure in which each page of a plurality of pages forming a display screen shared by a plurality of communication terminals is associated with one or more objects included in the each page;

receiving, from one communication terminal of the plurality of communication terminals, an operation request that requests an operation on a particular object of the one or more objects;

transmitting a success notification to the one communication terminal to notify success of the operation on the particular object, when editing of the particular object and editing of data in a lower layer associated with a higher layer of the particular object are both allowed, storing in the memory editability information representing editability of data in each of a plurality of layers forming the hierarchical data structure;

storing in the memory lower-layer editability information in association with the one layer, the lower-layer editability information representing editability of data in the lower layer, when one layer of the plurality of layers has a lower layer;

determining editing authority of an operation target based on the editability information and the lower-layer editability information stored in the memory;

setting the editability information associated with the particular object to a locked status to indicate that the editing of the particular object is restricted, when it is determined that there is editing authority to edit the operation target, the circuitry; and determining that editing of the operation target is prohibited, when the editability information is set to the locked status, the circuitry determines that editing of the operation target is prohibited.

8. A non-transitory recording medium storing a plurality of instructions which, when executed by one or more processors, cause the processors to perform a communication method comprising:

storing, in a memory, a hierarchical data structure in which each page of a plurality of pages forming a display screen shared by a plurality of communication terminals is associated with one or more objects included in the each page;

receiving, from one communication terminal of the plurality of communication terminals, an operation request that requests an operation on a particular object of the one or more objects;

transmitting a success notification to the one communication terminal to notify success of the operation on the particular object, when editing of the particular object and editing of data in a lower layer associated with a higher layer of the particular object are both allowed, storing in the memory editability information representing editability of data in each of a plurality of layers forming the hierarchical data structure;

storing in the memory lower-layer editability information in association with the one layer, the lower-layer editability information representing editability of data in the lower layer, when one layer of the plurality of layers has a lower layer;

determining editing authority of an operation target based on the editability information and the lower-layer editability information stored in the memory;

setting the editability information associated with the particular object to a locked status to indicate that the editing of the particular object is restricted, when it is determined that there is editing authority to edit the operation target, the circuitry; and determining that editing of the operation target is prohibited, when the editability information is set to the locked status, the circuitry determines that editing of the operation target is prohibited.

9. The communication method according to claim 7, further comprising:

transmitting an error notification to the one communication terminal to notify failure of the operation on the particular object, when the editing of the particular object is allowed but the editing of the data in the lower layer associated with the higher layer of the particular object is prohibited.

10. The communication method according to claim 7, further comprising:

transmitting an error notification to the one communication terminal to notify failure of the operation on the particular object, when it is determined that there is editing authority to edit the operation target.

11. The communication method of claim 7, further comprising:

receiving, from the one communication terminal, request information that requests setting of the editability of the data in the lower layer of the particular object; and setting the lower-layer editability information in accordance with the request information.

12. The communication method of claim 7, wherein:
the particular object is a stroke image rendered on the display screen, and
the method further comprising associating stroke data forming the stroke image and a page of the plurality of pages on which the stroke image is rendered with each other in the hierarchical data structure stored in the memory.

13. The communication method of claim 7, wherein:
editing of the particular object and editing of data in a lower layer associated with a higher layer of the particular object are both allowed, and
the one layer of the plurality of layers has the lower layer.

14. The non-transitory recording medium according to claim 8, wherein the method further comprises:
transmitting an error notification to the one communication terminal to notify failure of the operation on the particular object, when the editing of the particular object is allowed but the editing of the data in the lower layer associated with the higher layer of the particular object is prohibited.

15. The non-transitory recording medium according to claim 8, wherein the method further comprises:
transmitting an error notification to the one communication terminal to notify failure of the operation on the particular object, when it is determined that there is editing authority to edit the operation target.

16. The non-transitory recording medium according to claim 8, wherein the method further comprises:
receiving, from the one communication terminal, request information that requests setting of the editability of the data in the lower layer of the particular object; and
setting the lower-layer editability information in accordance with the request information.

17. The non-transitory recording medium according to claim 8, wherein:
the particular object is a stroke image rendered on the display screen,
the method further comprising associating stroke data forming the stroke image and a page of the plurality of pages on which the stroke image is rendered with each other in the hierarchical data structure stored in the memory.

18. The non-transitory recording medium according to claim 8, wherein:
editing of the particular object and editing of data in a lower layer associated with a higher layer of the particular object are both allowed, and
the one layer of the plurality of layers has the lower layer.

* * * * *